US005600466A

United States Patent [19]
Tsushima et al.

[11] Patent Number: 5,600,466
[45] Date of Patent: Feb. 4, 1997

[54] WAVELENGTH DIVISION OPTICAL SIGNALLING NETWORK APPARATUS AND METHOD

[75] Inventors: Hideaki Tsushima, Tokyo, Japan; Peter E. Barnsley; Alan McGuire, both of Suffolk, England

[73] Assignee: British Telecommunications public limited company, London, England

[21] Appl. No.: 216,876

[22] Filed: Mar. 24, 1994

[30] Foreign Application Priority Data

Jan. 26, 1994 [GB] United Kingdom ............ 9401488

[51] Int. Cl.$^6$ ........................................... H04J 14/02
[52] U.S. Cl. ..................... 359/124; 359/118; 359/165
[58] Field of Search ............................. 359/125, 124, 359/130, 117, 118, 119, 126, 121, 164, 165, 166, 167, 168

[56] References Cited

U.S. PATENT DOCUMENTS

| | | | |
|---|---|---|---|
| 4,742,576 | 5/1988 | McMahon | 359/126 |
| 4,748,614 | 5/1988 | Dammann et al. | 359/130 |
| 5,117,419 | 5/1992 | Konishi et al. | 359/118 |
| 5,189,541 | 2/1993 | Konishi | 359/118 |
| 5,218,662 | 6/1993 | Dugan | 359/118 |
| 5,365,344 | 11/1994 | Eda et al. | 359/124 |

FOREIGN PATENT DOCUMENTS

| | | | |
|---|---|---|---|
| 0452895A1 | 10/1991 | European Pat. Off. | 359/125 |
| 0497005A2 | 8/1992 | European Pat. Off. | 359/125 |
| 0519712 | 12/1992 | European Pat. Off. | 359/118 |
| 0090443 | 5/1985 | Japan | 359/140 |

OTHER PUBLICATIONS

Perrier et al, "High-Dimensionality Shared-Medium Photonic Switch", IEEE Transactions on Comm., vol. 41, No. 1, Jan. 1993, pp. 224–236.

Bogineni, et al, "A Collisionless Multiple Access Protocol for a Wavelength Division Multiplexed Star-Coupled Configuration: Architecture and Performance Analysis", Journal of Lightwave Technology 10 (1992) Nov., No. 11, New York, pp. 1688–1699.

Ramaswami, "Multiwavelength Lightwave Networks for Computer Communication", IEEE Communications Magazine, 31 (1933) Feb., No. 2, New York, pp. 78–88.

Banerjee et al, "FairNet: A WDM-based Multiple Channel Lightwave Network with Adaptive and Fair Scheduling Policy", Journal of Lightwave Technology, vol. 11, No. 5/6, May 1993, New York, pp. 1104–1111.

Yamaguchi et al, "A Broadband Access Network Based on Optical Signal Processing: The Photonic Highway", IEEE INFOCOM'90, 3 Jun. 1990, San Francisco, pp. 1030–1037.

(List continued on next page.)

*Primary Examiner*—Leo Boudreau
*Assistant Examiner*—Bhavesh Mehta
*Attorney, Agent, or Firm*—Nixon & Vanderhye P.C.

[57] ABSTRACT

A wavelength division multiplex communications system has a head station and a plurality of terminal stations interconnected by an optical fiber cable. The head station transmits CW modulated wavelengths ($\lambda_1$–$\lambda_k$), and a signalling wavelength ($\lambda_0$) which is used to indicate, in each time slot, which wavelengths in the following time slot are available for transmission. Each terminal station is arranged to receive the signalling wavelength ($\lambda_0$), to determine therefrom whether the next time slot contains any data packets for that terminal station and, if so, to receive the packets. Each terminal station is arranged, if it has a data packet to transmit, to determine from the signalling wavelength ($\lambda_0$) whether the next time slot already contains data packets for the destination station and, if so, to avoid data collision by not transmitting its own data packet. The terminal station then determines a free wavelength ($\lambda_t$) from the signalling wavelength ($\lambda_0$), modulates the free wavelength with the data packet it is to transmit, and modifies the signalling wavelength.

30 Claims, 18 Drawing Sheets

OTHER PUBLICATIONS

Ghose, "Performance Potentials of an Optical Fiber Bus Using Wavelength Division Multiplexing", Optoelectronic Interconnects, vol. 1849, 18 Jan. 1993, Los Angeles, pp. 172–183.

Tsushima ECOC'93, "19th European Conference on Optical Communication", Sep. 12–16, 1993, Proceedings, vol. 2, Regular Papers (Two Papers reporting Dispersion Compensation).

Smith et al, "Polarization–Independent Acoustically Tunable Optical Fiber", Appl. Phys. Lett. 56 (3), 15 Jan. 1990, pp. 209–211.

Yamazaki et al, "A Coherent Optical FDM CATV Distribution System", Journal of Lightwave Technology, vol. 8, No. 3, Mar. 1990, pp. 396–405.

Midwinter, "Photonics in Switching: the Next 25 Years of Optical Communications?", IEE Proceedings–J, vol. 139, No. 1, Feb. 1992, pp. 1–12.

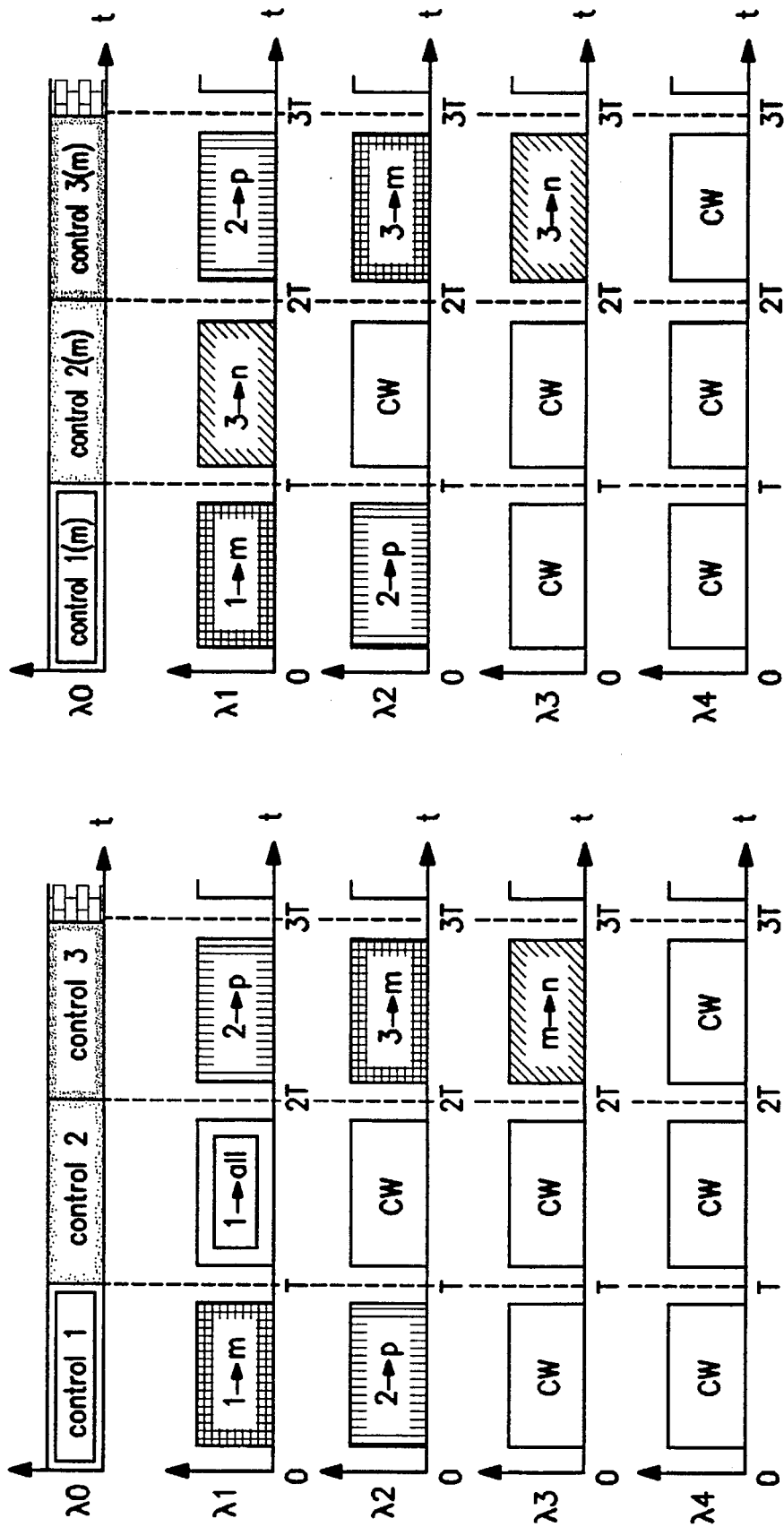

WAVELENGTH DIVISION OPTICAL SIGNALLING NETWORK APPARATUS AND METHOD

BACKGROUND OF THE INVENTION

1. Field of the Invention

This invention relates to an optical communications system, and to terminal equipment forming part of such a system. More particularly, this invention relates to an optical communications system comprising a plurality of terminals, interconnected by a light path (particularly but not exclusively, an optical fiber cable), and arranged to signal using selected wavelengths from a plurality of possible simultaneous signalling wavelengths.

2. Related Art

Optical communications systems are suitable for applications in which large volumes of data are to be communicated between stations, such as local area networks (LANs), or Metropolitan area networks (MANs). It is known to provide such networks using optical fiber cable to interconnect network stations, and signalling on selected ones of a plurality of wavelengths using wavelength division multiplexing (WDM).

One example of such a system, and specifically a terminal station for such a system, is described in the Proceedings of the Nineteenth European Conference on optical communication (ECOC' 93) Volume 2, paper TuP4.4, pages 121–124, Sep. 12–16 1993, I Chlamtac et al "A Multi-Gbit/s WDM Optical Packet Network with Physical Ring Topology and Multi-subcarrier Header Encoding". In the system there described, each terminal station consists of a laser tuned to operate at a single discrete frequency (different to the frequencies of all other lasers of all other stations in the system), a subcarrier receiver tuned to operate at a single discrete subcarrier frequency (different to the frequencies of all other receivers of all other stations in the system), and a tunable wavelength selector capable of selectively tuning to any of the transmitter wavelengths. All the stations are connected by a single optical fiber cable. Data is communicated in packets, all having the same predetermined length. When a station wishes to transmit a packet, it transmits a header on the subcarrier of the station to which the packet is to be sent, and then sends the data on its transmit wavelength by using its laser diode, the output of which is then coupled to the fiber. At the destination station, the header on a subcarrier is detected. The header includes an indication of the transmitting station, and therefore the transmitting wavelength, and this is used to tune the wavelength selector to the correct receiving wavelength, and the packet is received ("dropped") via the wavelength selector.

Because of the high bandwidth of optical fibers (or optical paths in general), it is possible to provide a reasonably large number of stations, each operating at a high data rate using this type of wavelength multiplexing system.

Further, because every station has its own transmit wavelength, there is no possibility of collision between data from different stations on the same wavelength.

However, the system does have several drawbacks. Firstly, it requires every station to have a different transmitting frequency, and this means either manufacturing a very large number of fixed frequency laser diodes of different frequencies, or providing a tunable laser at every station (which would require accurate wavelength stabilisation equipment at each station to avoid cross-talk between wavelengths). The same applies to the need for a separate subcarrier receiver for each station. Finally, the total number of stations must inevitably be limited to the total number of available wavelengths (and/or subcarriers).

EP 0452895 discloses an optical network system which comprises a plurality of terminal stations interconnected by an optical fiber cable. In a first embodiment, a base station transmits a plurality of different wavelengths. A first wavelength variable filter continually scans all the wavelengths, to attempt to find a free wavelength. When a free wavelength is found, the current setting of the first wavelength variable filter is used to set a second wavelength variable filter which extracts the free wavelength. The extracted free wavelength is modulated by an optical modulator, and recombined with the other wavelengths in a multiplexer. The initial part of the data transmitted by the modulator is an indication of the destination station for the data. All stations, therefore, also scan all the wavelengths to attempt to locate such a header indicating that data is addressed to them. When such a header is located, the second wavelength variable filter is set to the wavelength on which the header occurred, and the subsequent data is demodulated using a photosensor.

In the second embodiment, the method of reception of data is as in the first embodiment. The method of transmission of the data from a station differs, however, in that, instead of using an optical modulator to modulate the extracted free wavelength, two laser diodes are employed to generate free wavelengths which are modulated by optical modulators and multiplexer into the signals on the optical fiber. As before, a wavelength variable filter sweeps the available wavelengths to search for a free wavelength, and the laser diodes are set to the or each free wavelength. The laser diodes are stabilised by the transmission, from the base station, of a reference wavelength which is extracted by a separate wavelength variable filter, and used to control the laser diodes at each station.

Both embodiments thus avoid the need for every station to have a different transmitting frequency and a different receiving frequency, and hence either large numbers of laser diodes or temperature stabilisation at each station (although, in the second embodiment, some wavelength stabilisation circuitry is needed).

However, this is achieved only by sacrificing a major advantage of the first described (Chlamtac) system above; namely, its immunity from collision. In the system of EP 0452895, collision is highly likely because all stations are simultaneously scanning the free wavelengths in order to be able to transmit data. Thus, several stations may simultaneously detect that the same wavelength is free, and attempt to transmit data at the same time. Obviously, in this instance, all the transmitted data on that wavelength will become corrupted. For this purpose, EP 0452895 proposes to use the transmission protocol known as carrier sense multiple access/collision detection (CSMA/CD), in which stations detect collision of data and attempt re-transmission. However, this in turn can lead to repeated collisions, as the re-transmissions themselves collide; and, in any case, leads to delay in the transmission of data, and the need for further complicated circuitry to deal with the control of the collision protocols.

Furthermore, because each station needs continually to scan all frequencies to determine the wavelength on which data for that station may be transmitted, the rate of transmission is limited by the rate of scanning of the wavelength variable filter and the number of wavelengths to be scanned; since, if a destination indicating header is only scanned part way through, the receiving station may not correctly decode the destination, and accordingly may not decode the signal. For this reason, some form of acknowledgment signalling, and associated re-transmission of data, would appear to be increasingly necessary as the speed of transmission or the number of wavelengths employed in this system increases.

SUMMARY OF THE INVENTION

The present invention provides a wavelength division multiplex transmission system in which a station has means for receiving a signal indicating a free wavelength, and means for transmitting data on said free wavelength. The signal indicating a free wavelength may be transmitted on a separate, predetermined wavelength received by all stations in the system, which may or may not also be used for the transmission of data by stations. Preferably, the indication of a free channel is in the form of the absence of an indication that the channel contains data from another station. Preferably, the station comprises means for indicating that the wavelength is no longer free, for example by transmitting an indication to this effect (e.g. specifying that the channel contains a message). Thus, in this manner, it is possible to provide a wavelength multiplexing communications network in which the number of stations is not limited by the number of wavelengths employed, and the complexity of the optical transmission equipment at each station is reduced. At the same time, communication is conducted in a deterministic fashion, and collision can be substantially avoided.

The invention also provides a wavelength division multiplex communications system in which there is provided a common signalling channel (e.g. wavelength) receivable by all stations, in which each of a plurality of stations is arranged to transmit data on a wavelength selected from a plurality of wavelengths, and in which the station is also arranged to transmit an indication of the destination of said data on said common channel. Thus, the stations are not required continually to scan all available wavelengths of a plurality of wavelengths, nor is each station required to have a separately tuned subcarrier receiver, and so good transmission rates without complex hardware at the station may be achieved.

Other aspects, embodiments and preferred features of the invention are substantially as described or claimed hereafter.

BRIEF DESCRIPTION OF THE DRAWINGS

The invention will now be described in greater detail, by way of example, with reference to the accompanying drawings, in which:

FIGS. 4a–4f are diagrams showing the contents of each of the wavelengths of FIG. 3 over time, at progressive stages through the system of the first embodiment;

DETAILED DESCRIPTION OF EXEMPLARY EMBODIMENTS

First Embodiment

Figure 1:
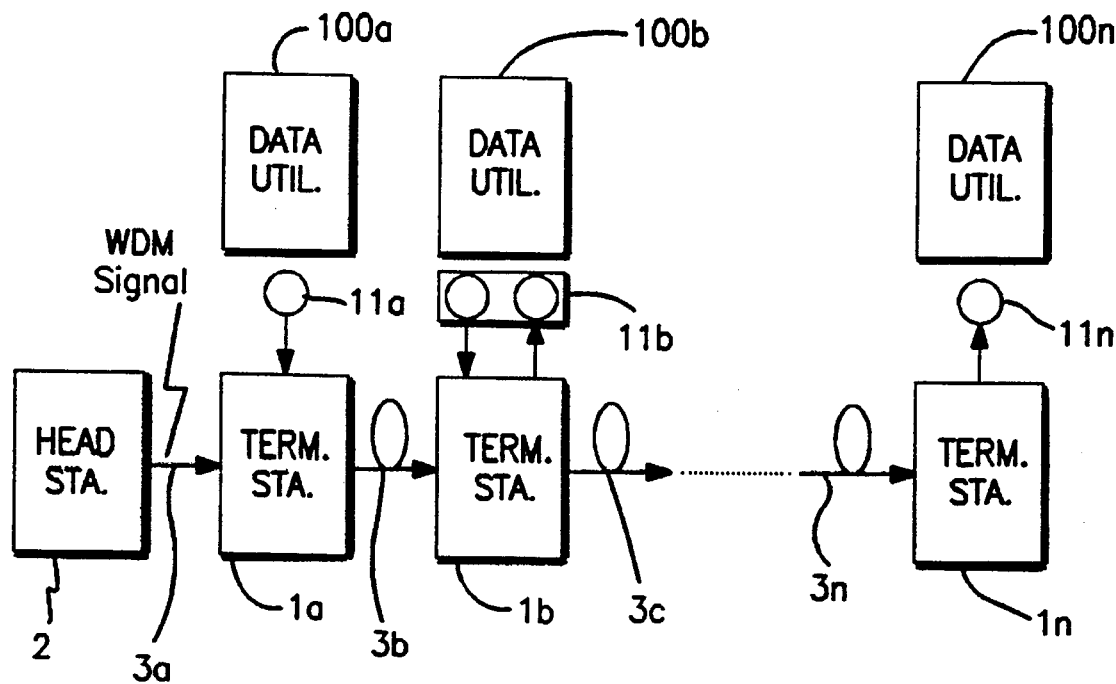
FIG. 1 is a block diagram showing schematically a bus arrangement of a first embodiment of the invention.

Referring to FIG. 1, a WDM LAN system comprises a plurality of terminal stations 1a, 1b, ... 1n and a head station 2. The head station 2 and the terminal stations 1 are connected in a chain configuration by an optical cable 3 comprising lengths of optical fiber 3a, 3b, 3c . . . In this embodiment, each station 1 is capable of passing data to each downstream station. Thus, this embodiment is useful where the terminal station 1a nearest to the head station 2 is to broadcast data to all other stations 1b ... 1n; or where a plurality of stations 1a, 1b ... are all to transmit data to a single station in (the furthest from the head station 2), as for example where a number of sensors are to communicate data to a data logging station, or where a plurality of computer terminals are to communicate with a single printer.

Connected to each of the terminal stations 1a, 1b, ... In is a respective data utilising apparatus 100a, 100b, ... 100n (for example, a computer, a printer or a sensor).

The terminal stations 1 each communicate with their respective terminal apparatus 100 by electrical input and output ports 11, and each terminal station carries an optical input port for receiving an optical cable 3 and an optical output port for receiving an optical cable 3, (except that the last terminal station ln, furthest from the head station 2, only requires an optical input port).

Figure 3:
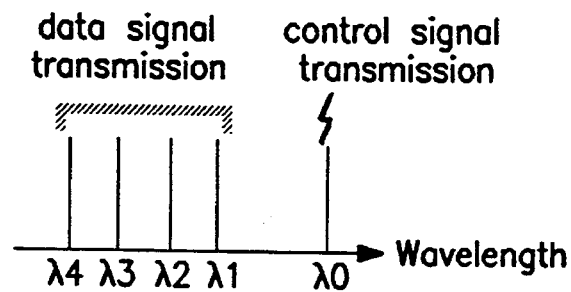
FIG. 3 is a diagram indicating the wavelengths used for transmission in the first embodiment.
Figure 2A:
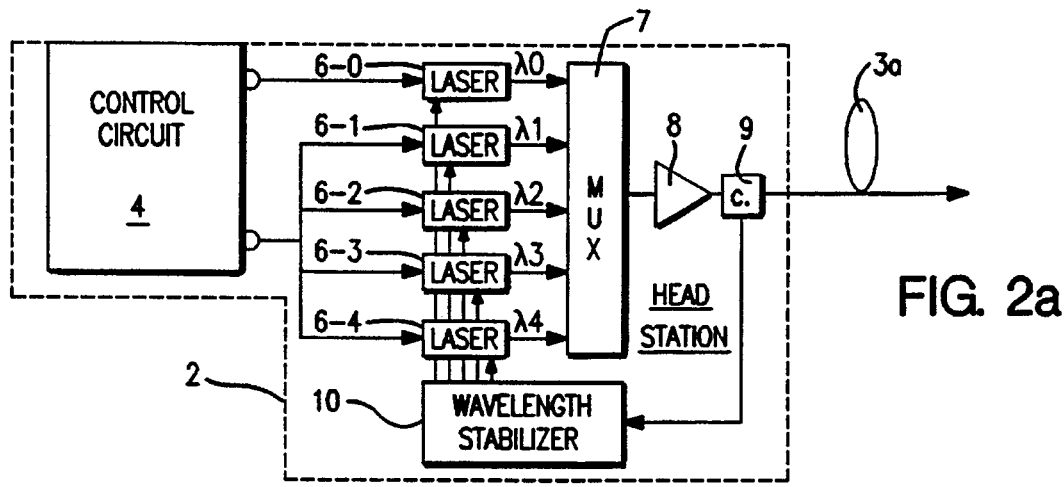
FIG. 2a is a block diagram showing schematically the elements of a head station according to the first embodiment.

Referring to FIG. 2a, the head station 2 comprises five laser diodes 6-0 to 6-4, each generating light at a corresponding frequency $\lambda_0$–$\lambda_4$ as indicated in FIG. 3. Each of the laser diodes 6 generates continuous wave (CW) light, and a control circuit 4 is provided to modulate the output of the laser diodes.

The wavelength $\lambda_0$ is used as a signalling wavelength for control signals, and the wavelengths $\lambda_0$–$\lambda_4$ are used as data transmission wavelengths.

The outputs of the laser diodes 6 are combined by a combining device 7, functioning as a wavelength multiplexer, which preferably comprises a grating device (e.g. a grating filter) receiving the light from the lasers at different incident angles, such that all the light leaves at a common diffraction angle, which light is launched into a light path containing an optical amplifier 8, for example an erbium doped fiber amplifier as described in Fourth Optoelectronics Conference OEC' 92 (Japan) Invited paper 1733-1, Technical Digest pages 281–283, B. J. Ainslie; "Erbium doped fiber amplifiers". This amplifier 8 may be omitted if the output of the wavelength multiplexer 7 is reasonably high.

A portion of the combined optical signal is tapped by an optical coupler 9, and fed back to a wavelength stabiliser circuit 10 which stabilises the wavelength of the laser diodes 6 and may be, for example, as described in IEEE Journal of Wave Light Technology, Vol. 8, No. 3, pages 396–405, March 1990, S. Yamazaki et al; "A Coherent Optical FDM CATV Distribution System".

Figure 2B:
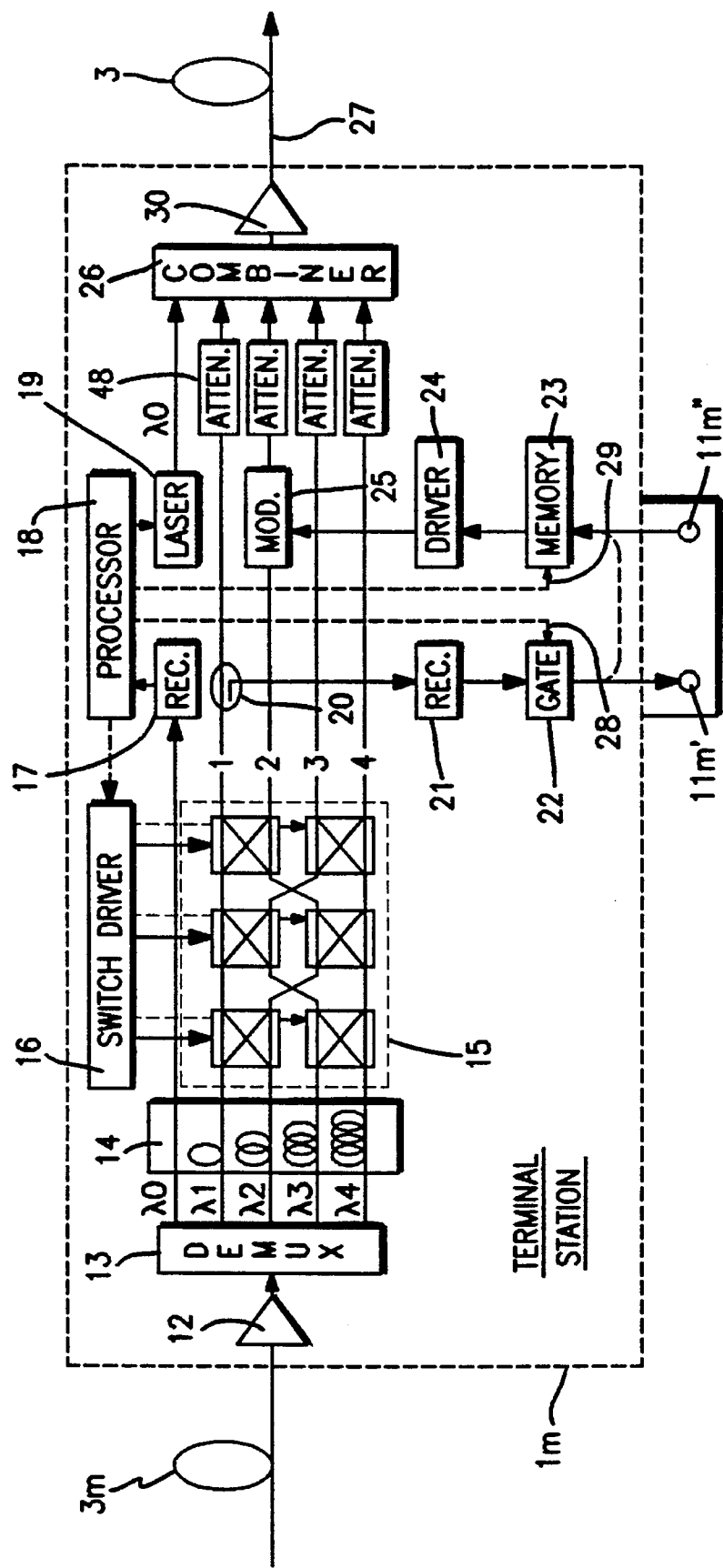
FIG. 2b is a block diagram showing schematically the elements of a terminal station according to the first embodiment.

After passing through the coupler 9, the combined light signal is injected into the optical fiber 3a, through which it arrives via other terminal stations 1 (not shown) and the optical fiber 3m, at the terminal station 1m illustrated in FIG. 2b.

After the fiber 3m is coupled to the optical input port (not shown) of the station 1m, the light beam is amplified, by an optical pre-amplifier 12 (e.g. an erbium doped fiber amplifier) to compensate for signal losses in the fiber 3m, and is wavelength demultiplexed (i.e. separated into spatially distinct beams of different wavelengths $\lambda_0$–$\lambda_4$) by a wavelength demultiplexer 13. The wavelength demultiplexer 13 is, for example, a grating device which may be identical to the wavelength multiplexer 7 of the head station 2, but in reverse configuration, so as to receive a signal beam, and split it into component wavelength beams.

As the optical fiber 3m will, in many cases, apply a chromatic dispersion to the light beam so as to delay different wavelengths by different amounts, there is provided a dispersion compensator 14 which consists, for each beam of different wavelength, of a length of optical fiber or other optical transmission medium. As the longest wavelengths are those most delayed by the chromatic dispersion of the fiber optic cable 3m, the lengths of fiber within the dispersion compensator 14 are inversely related to the wavelengths of the beams $\lambda_0$–$\lambda_4$.

For example, if the optical fiber 3m has a standard dispersion of 18 ps/nm/km and a length of 40 km, and if a wavelength spacing of 1 nm is used, a delay difference of 720 ps (equivalent to 144 mm of fiber) is necessary between adjacent wavelengths.

Thus, after each separated wavelength has passed through the respective length of fiber in the dispersion compensator 14, the signals at all the wavelengths $\lambda_0$–$\lambda_4$ are time aligned.

The signalling wavelength $\lambda_0$, generated by the laser 6-0 at the head station 2, is received at a photodiode (or other photosensor) receiver 17, where it is converted to an electrical signal which is supplied to a processor 18 (which may be a microprocessor or an ASIC).

The data transmission wavelengths $\lambda_1$–$\lambda_4$ are passed to a 4×4 non-blocking optical switch 15, so that any one of the four wavelengths at its input ports can be switched to any one of its four output ports. The non-blocking optical switch 15 is a commercially-available product described, for example, in IEEE proceedings—J, Vol. 139 No. 1, February 1993; J. E. Midwinter; "Photonics in Switching; the Next 25 Years of Optical Communications". The switch 15 is controlled by electrical control signals supplied by a switch driver circuit 16, and the switch driver circuit is controlled by receiver 17.

The processor 18 is connected to a laser diode 19 which emits light at the signalling wavelength $\lambda_0$.

A coupler (such as a fused fiber coupler) 20 is provided in one of the output lines from the optical switch 15, the coupler being arranged to tap a small part (e.g. 10%) of the power of the signal on that line to a photodiode (or other optical) receiver 21. The electrical output signal of the receiver 21 is supplied, via a gating circuit 22, to an electrical output (drop) port connected to the terminal apparatus 100.

An optical modulator 25 is connected to another of the output lines of the optical switch 15. The optical modulator 25 (which can, for example, simply have the structure of a two-port optical switch, only one input and one output of which are connected) modulates the optical signal on that output port in accordance with an electrical signal supplied by an electrical driver circuit 24 supplying a serial bit stream in accordance with parallel data held in a memory 23 connected to an add (input) electrical port 11m" of the terminal station 1m, for receiving signals from the terminal equipment 100 (not shown).

The optical signal from the modulator 25, the transmitter 19, the signal from the coupler 20, and the signals from the other two ports of the switch 15, after passing through a bank of attenuators 48 arranged to compensate for the drop in power caused by the modulation and tapping, so that all the combined wavelengths $\lambda_1$–$\lambda_4$ have equal power levels, are combined with signal from the transmitted 19 by a combiner 26. The data transmission wavelengths $\lambda_1$–$\lambda_4$ and the signalling wavelength $\lambda_0$ are, therefore, then recombined by the combiner 26 (which may be an optical coupler), and the combined optical signal is amplified by an optical amplifier 30 (e.g. an erbium doped fiber amplifier) to take account of the losses of the attenuator bank 48, the switch 15 and other components.

In this embodiment, one of the wavelengths is routed through the coupler 20 whether or not it contains data to be received. The processor 18 controls the gate circuit 22 to block the received data from the receiver 21 except when data is being received.

The operation of this embodiment will now be explained in greater detail.

Figure 4B:
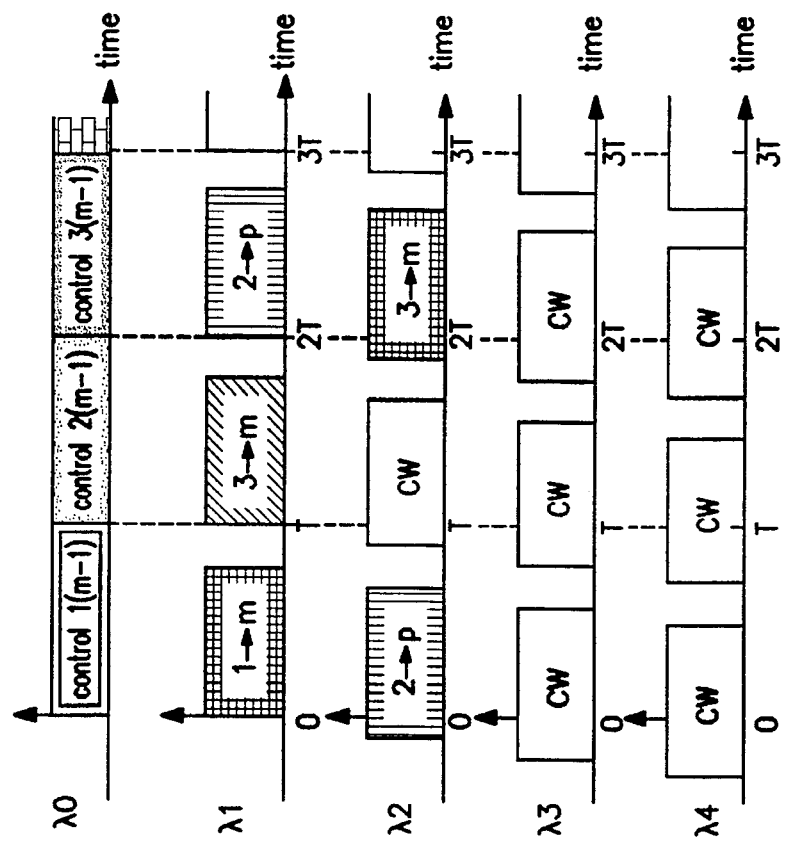
Figure 4A:
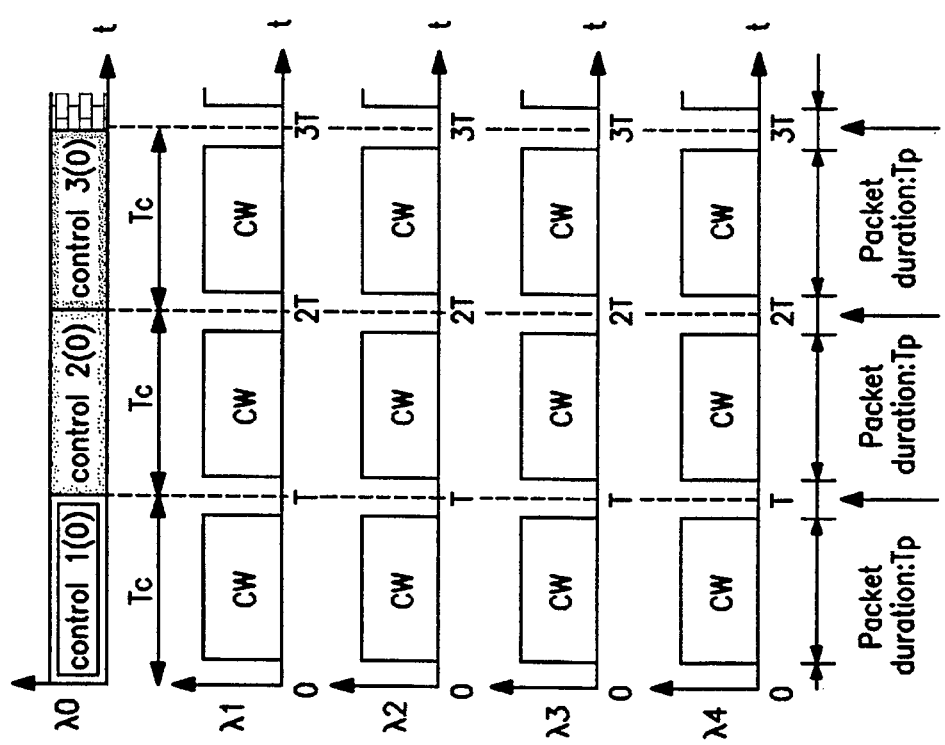

Referring to FIG. 4a, the control circuit 4 at the head station 2 generates regular pulses each of duration $T_p$, the pulses being separated by a guard time $T_g$ so that the pulse repetition rate is $T=T_p+T_g$. The pulses are applied to switch on and off the outputs of the data transmission wavelength laser diodes 6-1 to 6-4 (e.g. through modulators, not shown) so as to produce a slotted CW signal from each, as indicated in FIG. 4a. The control circuit 4 also generates a digital code which modulates the signalling wavelength laser diode 6-0, the code indicating that all wavelengths are free for signalling. This simple digital code is generated on all occasions except where, for example, one of the laser diodes 6-1 to 6-4 is damaged; in which case, a code indicating the identities of the wavelengths which are available for signalling is transmitted instead.

The transmitted code relates to the availability of wavelengths in subsequent time slots; typically, the next time slot, but possibly the next-but-one or the next-but-two time slots (to allow the terminal stations 1a–1n more time to configure themselves).

Referring to FIG. 4b, when the optical signal arrives at the ruth terminal station 1m, the (m−1) preceding stations have already commenced sending data. In the first time slot (0≦time≦T), the first station 1a has transmitted a data signal to the ruth station 1m of FIG. 2b (in a manner which will be discussed in greater detail below) on the wavelength $\lambda_1$, and the second station 1b has transmitted a data signal to the pth station 1p on the wavelength $\lambda_2$. In the second time slot, (T≦time≦2T), the third station 1c has transmitted a message to the nth station 1n on the wavelength $\lambda_1$. In the third time slot, (2T≦time≦3T), the second terminal station 1b has transmitted a further data signal to the pth terminal station 1p on the wavelength $\lambda_1$, and the third terminal station 1c has transmitted a message to the ruth terminal station 1m on the wavelength $\lambda_2$.

It will be seen that, due to the chromatic dispersion of the fiber 3m to which the terminal station 1m in FIG. 2b is connected, the time slots in the different wavelengths have become misaligned.

Referring to FIG. 4 c, after passing through the dispersion compensator 14, the time slots are shown to be substantially realigned. At this time, the terminal station 1m of FIG. 2b has a packet of data to be sent to the terminal station 1p, and a packet of data to be sent to the terminal station 1n, both stored in its memory 23, having previously been received from the associated terminal equipment 100m.

The receiver 17 in the terminal station 1m reads the digital signal carried by the signalling wavelength $\lambda_0$ in the time period between t=−T and t=0, labelled control 0(m−1) in FIG. 4 c. This contains four digital words; one for each of the transmission wavelengths $\lambda_1$14 $\lambda_4$ in the next time slot. The first word comprises an indication of the ruth terminal station (for example a five bit signal), and a corresponding indication of the destination terminal station for the first wavelength $\lambda_1$, and in this case indicates that the first terminal station 1a is transmitting a message to the station 1m. Similarly, the second word indicates that the second station 1b is transmitting a message to the pth station 1p on the wavelength $\lambda_2$. The third and fourth words indicate that the wavelengths $\lambda_3$ and $\lambda_4$ are free for message transmission in the time slot extending between t=0 and t=T.

The processor 18 receives the electronic digital data generated by the receiver 17, and extracts from it timing signals for synchronising the read-out from the memory 23 and read-in to the gate 22. The processor 18 studies the destination parts of each word, and matches these against its own stored terminal station number m. In this instance, a match is found in the word relating to the first wavelength $\lambda_1$. Accordingly, the processor 18 controls the switch driver 16 to set the switch 15 to route the wavelength $\lambda_1$ from its input port at the switch through to the first output port of the switch, at which is located the coupler 20. Then, in the following time slot from t=0 to t=T, the processor 18 generates a gating signal 28 lasting the duration of a time slot to switch the electrical output signal of the receiver 21 to the electrical output port connected to the terminal equipment 100m, so as to drop the data packet on the wavelength $\lambda_1$.

At the same time, the processor 18 has an indication that data in the memory 23 is awaiting transmission. Accordingly, the processor 18 notes the occurrence of the first word indicating a free wavelength, in this case the wavelength $\lambda_3$ in the following time slot between t=0 and t=T.

However, since the packet in the memory 23 to be transmitted is destined for the terminal station 1p, and since the processor 18 has decoded the signalling wavelength $\lambda_0$ and decoded has an indication that the wavelength already contains a data packet destined for the terminal station 1p, if the packet were transmitted on the free wavelength $\lambda_3$ in the next time slot, the terminal station 1p would receive two messages simultaneously, and would only be able to decode one of these.

Accordingly, to avoid this collision at the destination terminal station 1p, the processor 18 does not transmit on any of the free wavelengths in the next time slot.

The processor 18 then controls the transmitter 19 to re-transmit the received header data, in exactly the same form, on the signalling wavelength $\lambda_0$, in the timeslot between t=−T and t=0.

Since the total volume of information signalled on the signalling wavelength $\lambda_0$ is relatively low compared to that on the data transmission wavelengths, the incoming data will be received during a relatively early portion of the time slot between t=0 and t=T.

Because the processor 18 takes a finite processing time ($T_R$) to read and regenerate the signalling data (although the time may in fact be quite short, since the volume of data is low), it cannot write the data to exactly the right time position in the time slot. Accordingly, a delay (5-1 to 5-4) of length equal to $T_R$ is positioned in the path of each data wavelength $\lambda_1$–$\lambda_4$ to bring them into time alignment with the ($T_R$ delayed) signalling wavelength $\lambda_0$. The delays (5-1 to 5-4) may be effected by lengths of fiber, and could conveniently be provided combined with the dispersion compensator 14.

During the next time slot between t=0 and t=T, whilst the incoming data on the wavelength $\lambda_1$ is being dropped, the processor 18 reads the signalling channel $\lambda_0$ and detects a free wavelength $\lambda_2$ in the following time slot from t=T to t=2T. Moreover, in this time slot there is no conflicting message to the terminal station 1p. Accordingly, the processor 18 will transmit data on this wavelength $\lambda_2$, in which case it must re-write the word on the signalling wavelength $\lambda_0$. The processor 18 controls the laser diode 19 of the station 1m to generate a control signal indicating that the wavelength $\lambda_1$ is occupied with a message from the third terminal station 1c to the nth terminal station 1n; this portion of the message transmitted by the diode 19 being identical to that received by the receiver 17. However, the processor 18 also adds a message that the wavelength $\lambda_2$ will contain a message from the terminal station 1m to the terminal station 1p, and that only the wavelengths $\lambda_3$ or $\lambda_4$ are now free.

Figure 4D:
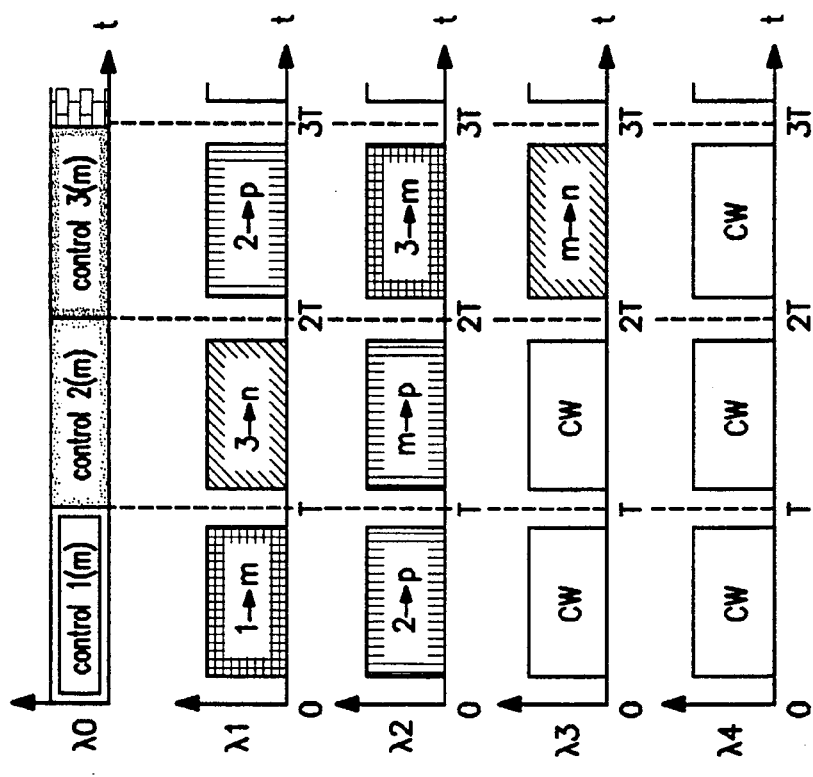
Figure 4C:
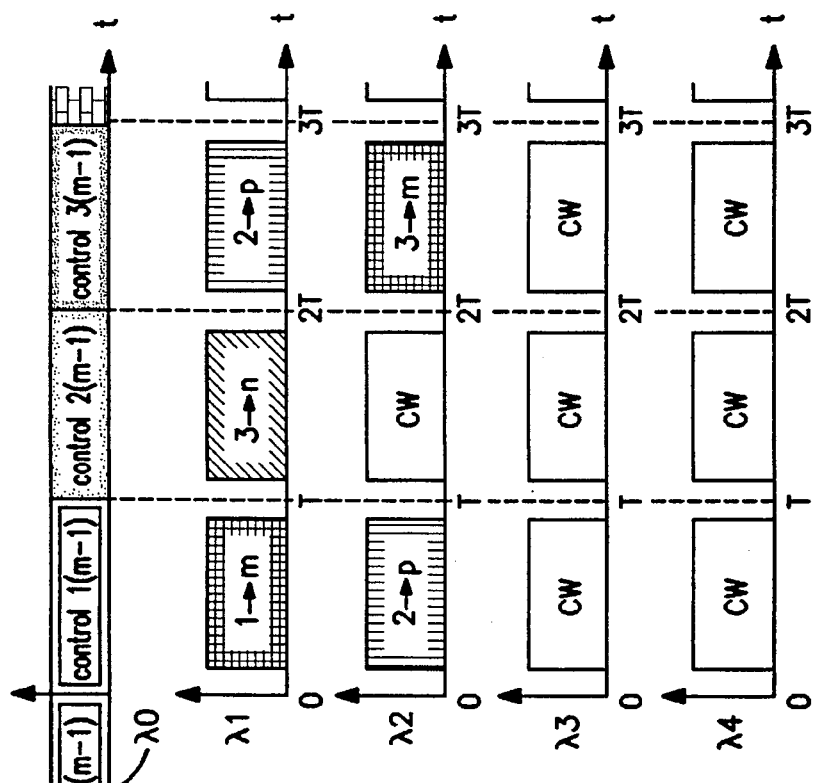

Referring now to FIG. 4d, during the time slot from t=T to t=2T, the processor 18 controls the switch 15 to route the selected wavelength $\lambda_2$ from its input port of the switch 15 to the second output port of the switch 15, at which is located the modulator 25. The CW signal input to the modulator 25 is then modulated in accordance with data packet stored in, and supplied from, the memory 23, which data packet is read out as a serial bit stream under control of the processor 18 through the driver circuit 24. Thus, as shown in FIG. 4d, during the second time slot, the avelength $\lambda_2$ is occupied by this transmitted data packet (from the station 1m to the station 1p). The modulated wavelength is recombined with all the others by the combiner 26 for re-transmission.

Whilst this data packet is being transmitted, in the time slot from t=T to 2T, the receiver 17 decodes the control signal (control 2(m)) during the same time interval, and notes that the wavelength $\lambda_3$ is free in the following time slot from t=2T to t=3T, and that there is an incoming packet for the terminal station $1m$ on the wavelength $\lambda_2$.

Accordingly, the processor 18 transmits, via the laser diode 19, an amended signal on the signalling wavelength $\lambda_0$ indicating (in addition to the previous data received by the processor 18), that a packet from the station $1m$ to the station $1n$ will be transmitted on the wavelength $\lambda_3$ in the next time slot, and that this wavelength is thus not free.

In the next time slot between 2T and 3T, the processor 18 controls the switch driver 16 to route wavelength $\lambda_2$ to the coupler 20, so that the packet on that the wavelength can be dropped, and routes the CW modulated signal on the wavelength $\lambda_3$ through to the modulator 25, which modulates onto that wavelength the data packet for the station $1n$, the modulated wavelength being recombined with the others at the combiner 26 for transmission to the next station.

As well as sending single packets of data from one terminal station to another, it is possible to broadcast data from one terminal station to all the terminal stations further down the fiber (or from the head station 2 to all the terminal stations 1). Thus, referring to FIG. 4e, the control word on the signalling wavelength $\lambda_0$ in the time slot t=0 to t=T indicates that, in the following time slot, a message from the first station $1a$ to all other stations is being transmitted. Accordingly, the processor 18 of each station will control its switch 15 to route the wavelength $\lambda_1$ to its coupler 20, to drop that wavelength at each station.

Further, if (as shown in FIG. 2b) a selectable feedback path is provided from the gate 22 to the memory 23, wavelength translation may be performed at each terminal station by receiving a data packet, routing the packet from the gate 22 to the memory 23, and re-transmitting the packet in a subsequent time slot. This may be useful where, for example, a failure of the switch 15 of a given station makes it impossible to connect one of the wavelengths (for example the wavelength $\lambda_1$) to its coupler 20, so that packets on the wavelength $\lambda_1$ cannot be received at that terminal station. Accordingly, a preceding terminal station may perform wavelength translation to move the packet to one of the other wavelengths.

The effect of this is illustratively indicated in FIG. 4f, in which a data packet in the time slot T-2T from the third terminal station $1c$ to the nth terminal station in has been received on the wavelength $\lambda_1$ and re-transmitted on the wavelength $\lambda_3$ in the following time slot. Such wavelength translation may, for example, be instructed by a control signal on the signalling wavelength $\lambda_0$ from the head station 2, or from another terminal station 1, or may be preprogrammed into the processor 18.

Variation of the first Embodiment

Various modifications or substitutions can be made to the structure and function of the first embodiment. For instance, the wavelength multiplexers and demultiplexers, instead of being grating interferometer devices, may be Mach-Zender devices, dielectric multiple thin film filters, or even optical couplers. The optical amplifier 8 may, instead of being a fiber amplifier, be a semiconductor optical amplifier. Optical amplifiers in the head station 2 and in the terminal stations 1 may be omitted if the losses in the wavelength multiplexers and fibers 3 are sufficiently low, or if the fibers 3 are of the self-amplifying type (e.g. erbium doped fibers), or if separate repeater stations are provided to amplify the signals.

The laser diodes 6 may be substituted by light emitting diodes, gas lasers, fiber lasers or other suitable light source.

Figure 5A:
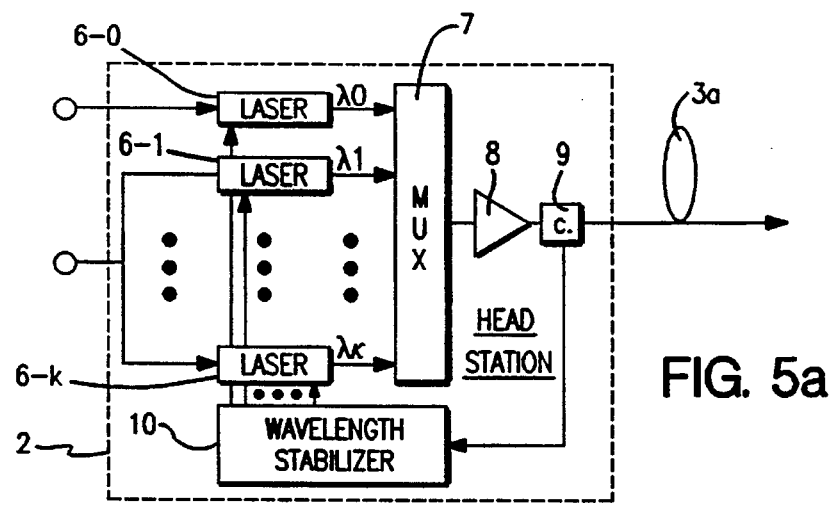
FIG. 5a is a block diagram corresponding to FIG. 2a, and showing a head station of the first embodiment in generalised form.
Figure 5B:
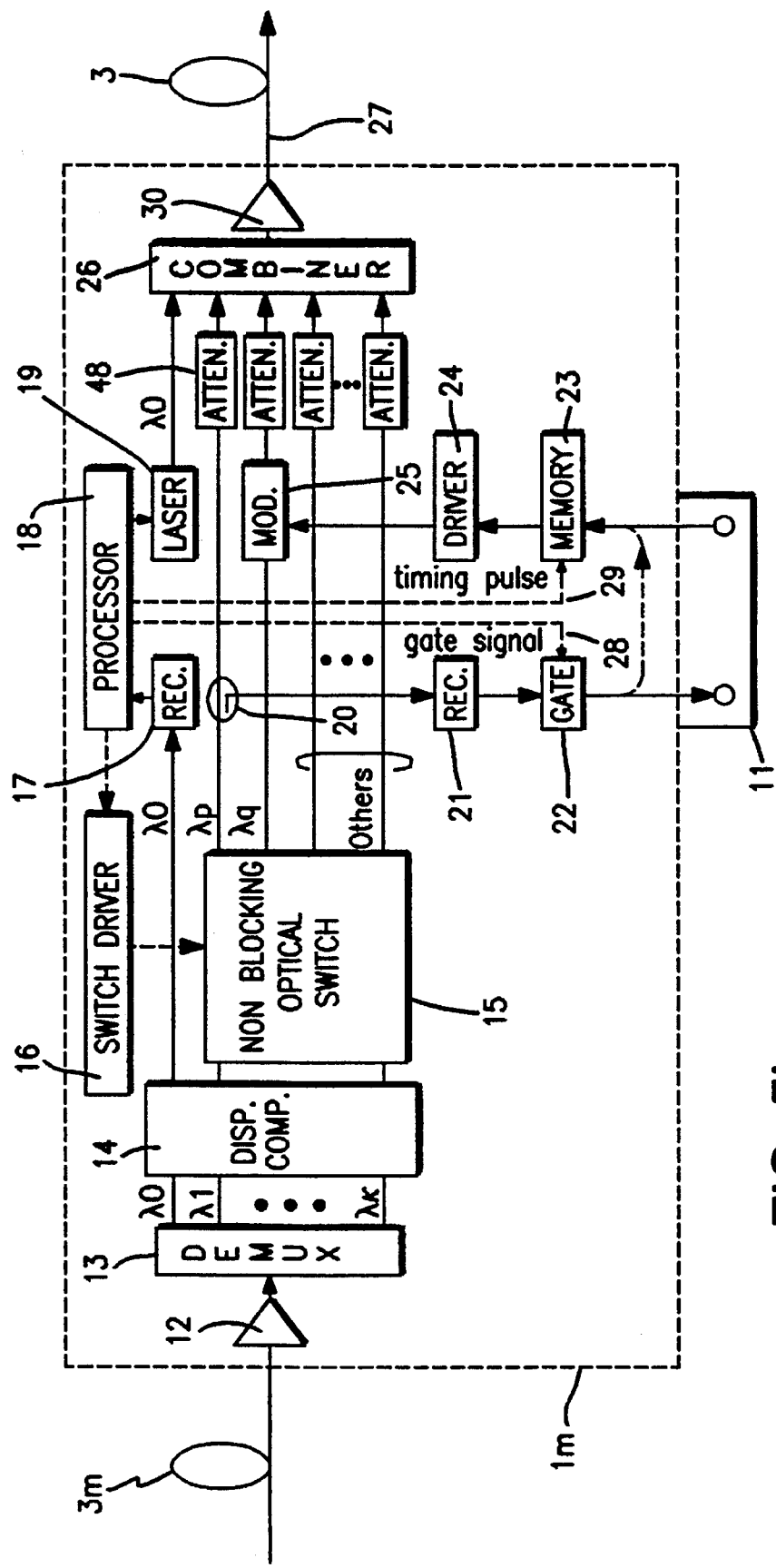
FIG. 5b is a block diagram corresponding to FIG. 2b, and showing a terminal station of the first embodiment in generalised form.

Naturally, other numbers of wavelengths are possible. For example, FIG. 5 illustrates the generalised structure of the first embodiment for k wavelengths.

The guard time $T_g$ is provided to allow for switching of the optical devices (e.g. the switches 15) in the terminal stations 1, but it is possible to omit the guard time and provide CW light, if no data transmission is actually performed during the switching time.

The signalling wavelength $\lambda_0$ can furthermore be used to carry other signalling and control information concerning the operation, administration and maintenance of the network, or even low bit rate communications between terminal stations. Data may be transmitted on the signalling wavelength $\lambda_0$ in the synchronous digital hierarchy (SDH) format, as described in "Transmission Networking: SONET and Synchronous Digital Hierarchy"; M. Sexton & A. Reid, 1992 published by Artech House, U.S.A., ISBN 0-89006-551-9.

Accordingly, the processor 18 of each terminal station 1 may write status information concerning its operation (e.g. including any component failures) to the signalling channel.

The optical modulator 25 of each station 1, may, for example, be an electro-absorption modulator, or a Mach-Zender modulator, and may use amplitude modulation, frequency modulation, phase modulation or some other modulation system.

The dispersion compensation unit 14 of each station 1 may, rather than comprising an array of optical fibers of different lengths, comprise a single dispersion compensation fiber (i.e. a fiber having the reverse chromatic dispersion behaviour), as described in Proceedings of the Nineteenth European Conference on Optical Communications (ECOC' 93) Sep. 12–16 1993, Vol. 2, paper WeC8.3, pages 349–352, A. Belov et al; "The Realisation of Broadband Dispersion Compensation using the Multicladding Waveguide Structure", or in the same Conference Proceedings at paper WeC8.5 at pages 357–360, M. Onishi et al; "High Performance Dispersion—Compensating Fibre and its application to Upgrading of 1.31 μm optimised system".

In this case, each dispersion compensator 14 would be positioned upstream of the associated wavelength demultiplexer 13. Alternative devices such as optical rings, Fabry Perot resonators, or compensators using optical phase conjugation techniques could also be employed. Rather than employing a parallel bank of delays, different wavelengths could be separated out one at a time and a ladder structure of differential delays in series could be employed between separation points.

The dispersion compensators 14 might be omitted under exceptional circumstances, for example where the fibers 3 comprise very short lengths of fiber; or where the chromatic dispersion of the fibers is low. It would also, of course, be possible to position the dispersion compensators 14 between the terminal stations, rather than at terminal stations, or to position each of these at the output side of the upstream station (either the head station 2 or a terminal station 1), so as to pre-distort the multiplexer signal such that the dispersion of the fibers 3 will result in an undistorted signal arriving at the terminal stations.

The wavelength stabiliser 10 of the head station 2 may be omitted if a sufficiently large wavelength spacing between adjacent wavelengths (for example more than 1 nm) can be provided. In this case, rough temperature stabilisation for each light source 6 is sufficient to avoid crosstalk. Of course, such an arrangement makes less efficient use of the fiber bandwidth.

It would be possible to omit some or all of the optical attenuators 48, if the optical power difference between different wavelengths is sufficiently small, and the phrase "attenuator" will also be understood to encompass an optical amplifier having a gain of greater than unity in some or all of the wavelength paths.

Although FIG. 2b shows a 4×4 non-blocking optical switch 15 which is realised as a 2×3 array of 2×2 non-blocking optical switch elements, it will be apparent that other configurations for non-blocking optical switches could equally be employed.

This embodiment may operate in the 1.55 μm wavelength domain, at 155 Mbit/s or 2.5 Gbit/s per wavelength data rates, for example.

In summary, the first embodiment shows an arrangement in which each terminal station 1 has a coupler device for tapping and receiving data from a selected wavelength, and a modulator device for modulating data onto a selected wavelength, the data transmission wavelengths being spatially separated and selectively switched to the coupler or the modulator by a (non-blocking) optical switch. In a given terminal station 1, the signalling wavelength $\lambda_0$ is received, and the contents thereof are re-transmitted by the laser 19 of that terminal station.

Second Embodiment

Figure 6:
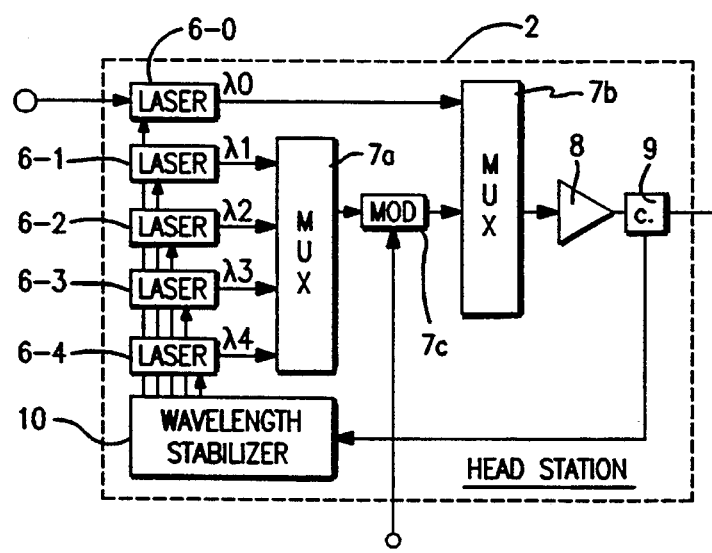
FIG. 6 is a block diagram showing schematically the construction of a head station of a second embodiment of the invention.

FIG. 6 (which corresponds to FIG. 2a) shows the head station 2 of the second embodiment. The head station 2 is generally the same as that of the first embodiment described above, and so will not be described in detail. However, in the head station 2 of this embodiment, instead of providing a single wavelength multiplexer 7, there are provided a first wavelength multiplexer 7a, which combines the data transmission wavelengths $\lambda_1$–$\lambda_4$ from the light sources 6-1 to 6-4 to provide a single combined light beam, and a second wavelength multiplexer 7b which combines this data transmission light beam with the signalling wavelength $\lambda_0$ from the light source 6-0 to produce the same output as the wavelength multiplexer 7 in the first embodiment. Rather than modulating the output of each laser diode 6-1 to 6-4 separately, the control circuit 4 in this embodiment can supply a single modulation pulse train to operate a modulator device 7c located in the combined data transmission beam between the output of the wavelength multiplexer 7a and the input of the wavelength multiplexer 7b, so as to modulate all the data transmission wavelengths $\lambda_1$–$\lambda_4$ simultaneously. As in the first embodiment, the modulator 7c may be, for example, an electro-absorption modulator or a Mach-Zender modulator. Since only one modulator is necessary, the head station structure may be simpler than in the first embodiment.

Third Embodiment

Figure 7:
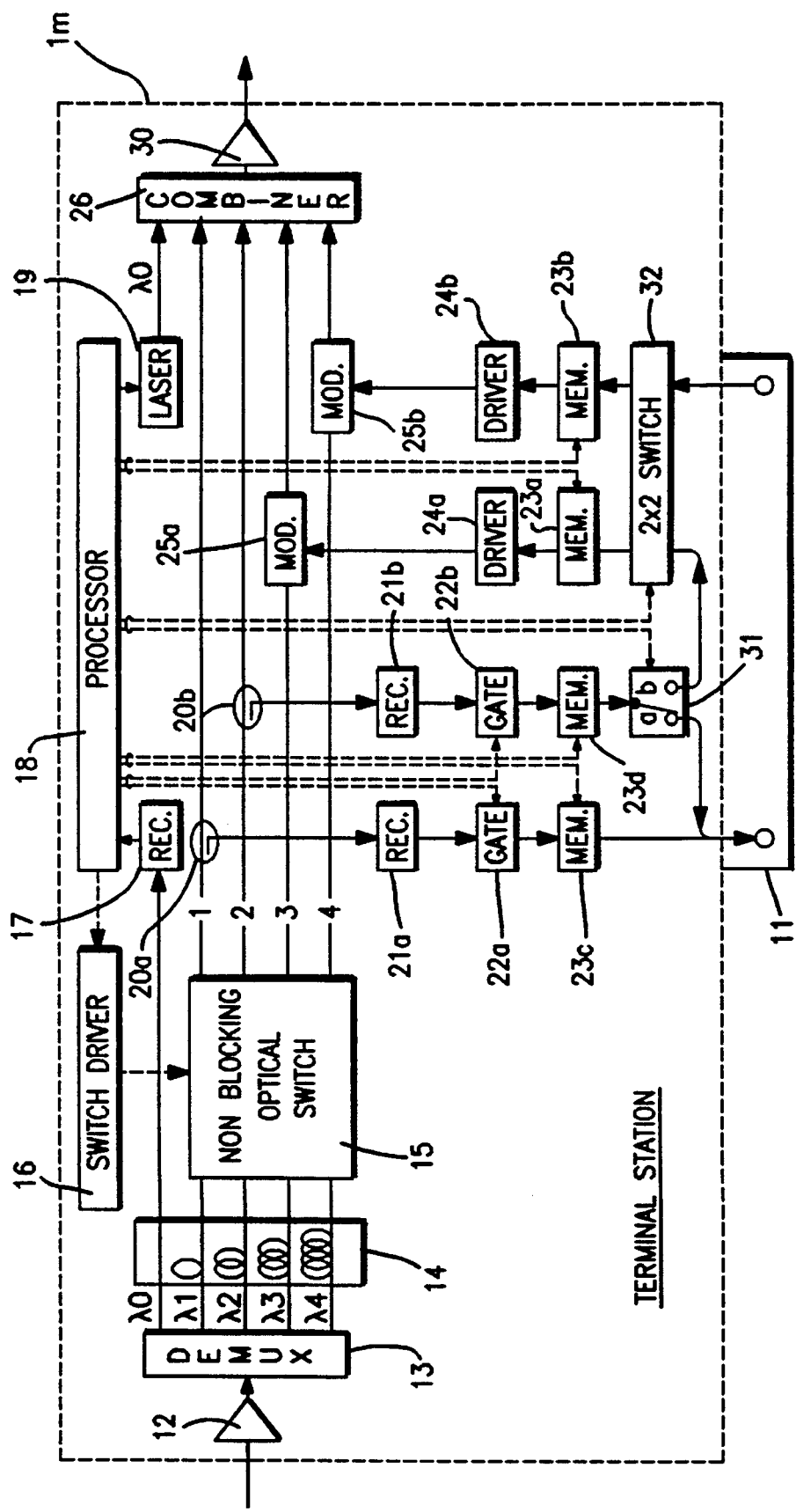
FIG. 7 is a block diagram showing schematically the structure of a terminal station of a third embodiment of the invention.

FIG. 7, shows a terminal station 1m of the third embodiment, all details of this embodiment being the same as in the first or the second embodiments except as discussed below.

In this embodiment, two drop paths are provided for dropping data from two wavelengths simultaneously. Also two add paths are provided for adding data to two wavelengths simultaneously.

Each of the add paths comprises a packet (buffer) memory 23a, 23b a driver circuit 24a, 24b and a modulator 25a, 25b. The two modulators 25a, 25b are connected to different output ports of the switch 15.

Likewise, each of the two drop paths comprises a receiver 21a, 21b and a gating circuit 22a, 22b. Additionally, packet memories 23c, 23d are provided in each drop path to retain the incoming packets, so that one packet can be retained while the other is output to the associated terminal equipment 100m.

Furthermore, an electrical switch 31 is provided for selectively routing the output of one of the memories 23d either to the terminal equipment 100m, or on the wavelength translation path to the add paths. Also provided in this embodiment is a 2×2 electrical switch 32 whose input ports receive one output of the switch 31 and one output from the terminal equipment 100m. This switch 32 routes these inputs to a selected one of the memories 23a, 23b. The switches 31, 32 are set under control of the processor 18.

Other details of this embodiment are as disclosed in relation to FIG. 2b.

Thus, the processor 18 can selectively route any two of the data transmission wavelengths $\lambda_1$–$\lambda_4$ to the two modulators 25a, 25b, and thus two data packets can simultaneously be transmitted. The processor 18 is, in this case, arranged to write corresponding information to the signalling wavelength $\lambda_0$ indicating that two packages are transmitted.

Likewise, the processor 18 can route two incoming wavelengths containing data packets to the two couplers 20a, 20b for simultaneous reception of two data packets. The memories 23a, 23b and the switch 31 are arranged so that the memories 23c, 23d are coupled in sequence to the electrical output port connected to the terminal equipment 100m.

Thus, the data transmission rate in this embodiment can be higher. Since each terminal station 1 can receive two packets simultaneously, unlike the first embodiment, if the processor 18 of, say, the station 1m detects a packet is already being transmitted to the terminal station 1p, and the station 1m has a packet to be transmitted to the station 1p, it can proceed to do so without fear of collision. However, if the signalling wavelength data indicates that two packets are already being simultaneously transmitted to the station 1p on different wavelengths, the processor 18 in this embodiment will not cause a further packet to be sent to that station, so as to avoid overloading the station with three packets.

It will be apparent that other numbers of add and drop paths, functionally identical to those shown in FIG. 7 can be employed, up to the number of data transmission wavelengths employed (in this case four). For example, four add paths and two drop paths may be provided, or three drop paths and two add paths.

Thus, in this embodiment, several add and/or drop paths are provided in parallel to permit simultaneous adding and/or dropping a plurality of wavelengths, and wavelengths are selectively routed to the add and/or drop paths by an optical spatial switch.

Fourth Embodiment

Figure 8:
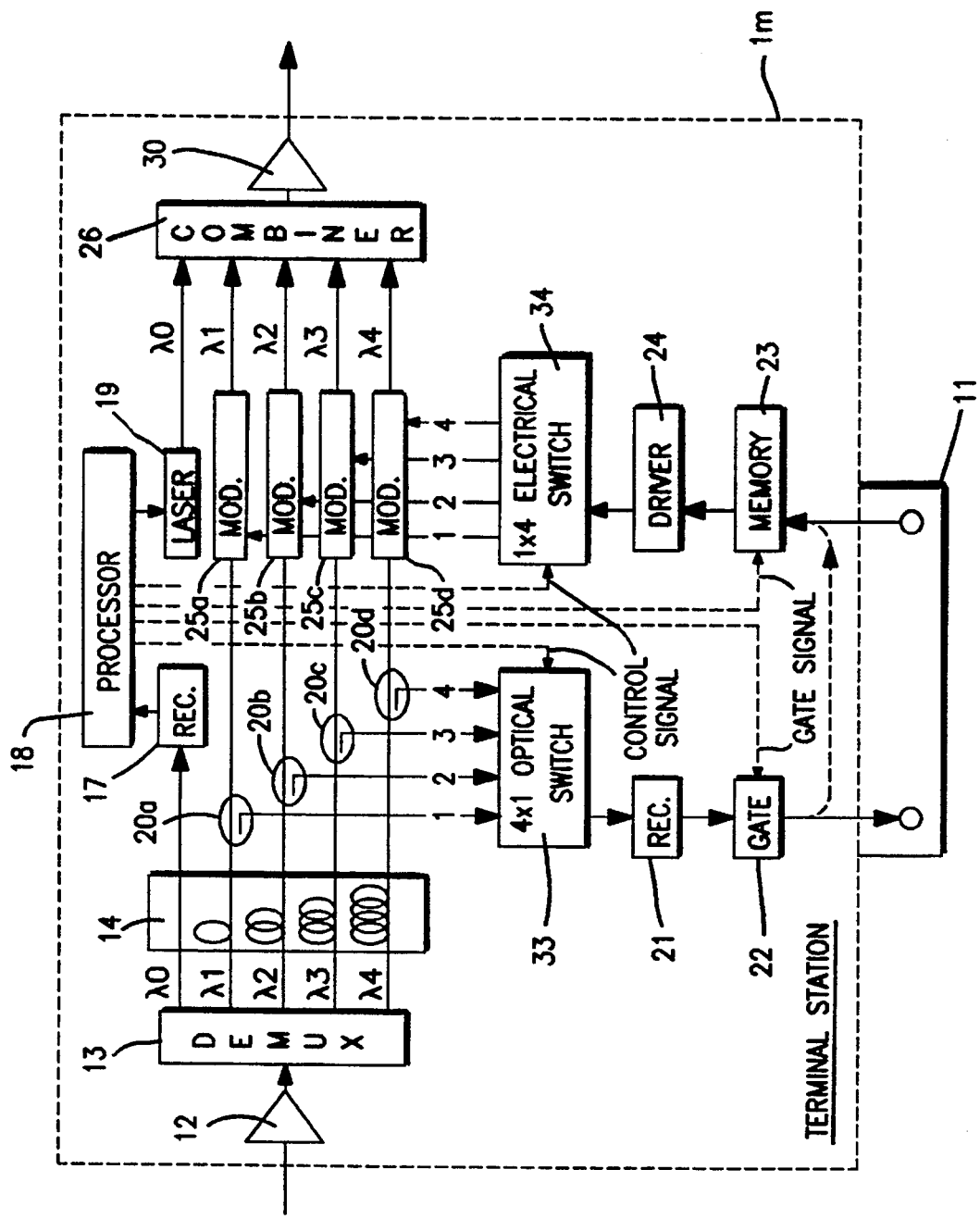
FIG. 8 is a block diagram showing schematically the structure of a terminal station of a fourth embodiment of the invention.

FIG. 8 shows the station 1m of the fourth embodiment, all details of this embodiment being the same as in the preceding embodiments except where otherwise indicated below.

In this embodiment, the optical switch 15 is omitted, and there is a direct optical path between the wavelength demultiplexer 13 and the combiner 26 for each of the data transmission wavelengths $\lambda_1$–$\lambda_4$. In each of these paths is a respective coupler 20a–20d and a respective modulator 25a–25d. The four outputs of the four couplers 20a–20d are received at respective input ports of a 4×1 optical switch 33, which (under control of the processor 18) selectively routes one of the outputs (i. e. one of the data transmission wavelengths $\lambda_1$–$\lambda_4$) to the receiver 21 and the gate 22, which operate as in the first embodiment.

Likewise, the four control inputs of the modulators 25a–25d are connected to respective output ports of a 1×4 electric switch (selector) 34, which selectively connects the control signal from the driver 24 and the memory 23 to one of the modulators 25a–25d (and hence one of the data transmission wavelengths $\lambda_1$–$\lambda_4$) under control of the processor 18.

Thus, when the processor 18 is aware that a data packet for the terminal station 1m is arriving on a wavelength (say the wavelength $\lambda_3$), the processor controls the switch 33 to connect the output of the coupler 20c through to the receiver 21 to receive the packet.

Likewise, when the processor 18 has located a free wavelength (say the wavelength $\lambda_4$) on which to transmit ("add") a packet held in the memory 23, the processor controls the switch 34 to route a signal from the driver 24 to the modulator 25d. In each case, the other modulators 25 are set to an inactive condition, in which they provide a straight-through path for the wavelengths concerned.

Various changes could be made to this embodiment. For instance, the optical switch 33 could be omitted, and the single receiver 21 could be replaced by four receivers 21a–21d, one in each of the output lines of the couplers 20a–20d. In this case, a 4×1 electrical switch would be provided for selectively routing the output of one of the receivers 21a–21d to the gate 22.

If the optical switch 33 has a null state, in which none of the inputs thereto is connected to the output, then the gate circuit 22 could be omitted, as setting the optical switch 33 to the null state would effectively gate the signal therethrough.

In this embodiment, the combiner 26 is preferably a wavelength multiplexer (e.g. of the diffraction grating type, or any of the other types mentioned above), since this structure has a lower insertion loss than a conventional coupler. This is possible because, in this embodiment, the path followed by each wavelength is predetermined, and does not vary over time.

It will be apparent that, although in FIG. 8 only a single drop path and a single add path are shown, the arrangement could be expanded in a similar manner to that discussed above with reference to FIG. 7 to allow for simultaneous add and drop of packets. For example, the switches 33 and 34 could be omitted, and separate receivers 21a–21d and gates 22a–22d could be provided in each output path of each coupler 20a–20d, connected to respective temporary buffer memories as in FIG. 7 to retain received packets. Likewise, four separate driver circuits 24 and packet transmission memories 23 could be provided in the respective input paths to the four modulators 25a–25d, the processor 18 selectively operating up to four of the couplers and modulators simultaneously.

The modulators in this embodiment may, for example, be lithium niobate modulators as disclosed in the above referenced Midwinter paper.

In summary, in this embodiment, a modulator and a coupler are provided in each of the demultiplexed data transmission wavelength paths, and consequently the optical switch 15 of each terminal 1 may be omitted (together with its switch driver circuit 16). Accordingly, the insertion loss associated with the optical switch 15 is omitted, and the overall loss in each terminal 1 in this embodiment is lower. Furthermore, the control circuitry for controlling the switches 33 and 34 can be made somewhat simpler than the switch driver circuit 16 required for the optical switch 15.

Fifth Embodiment

Figure 9:
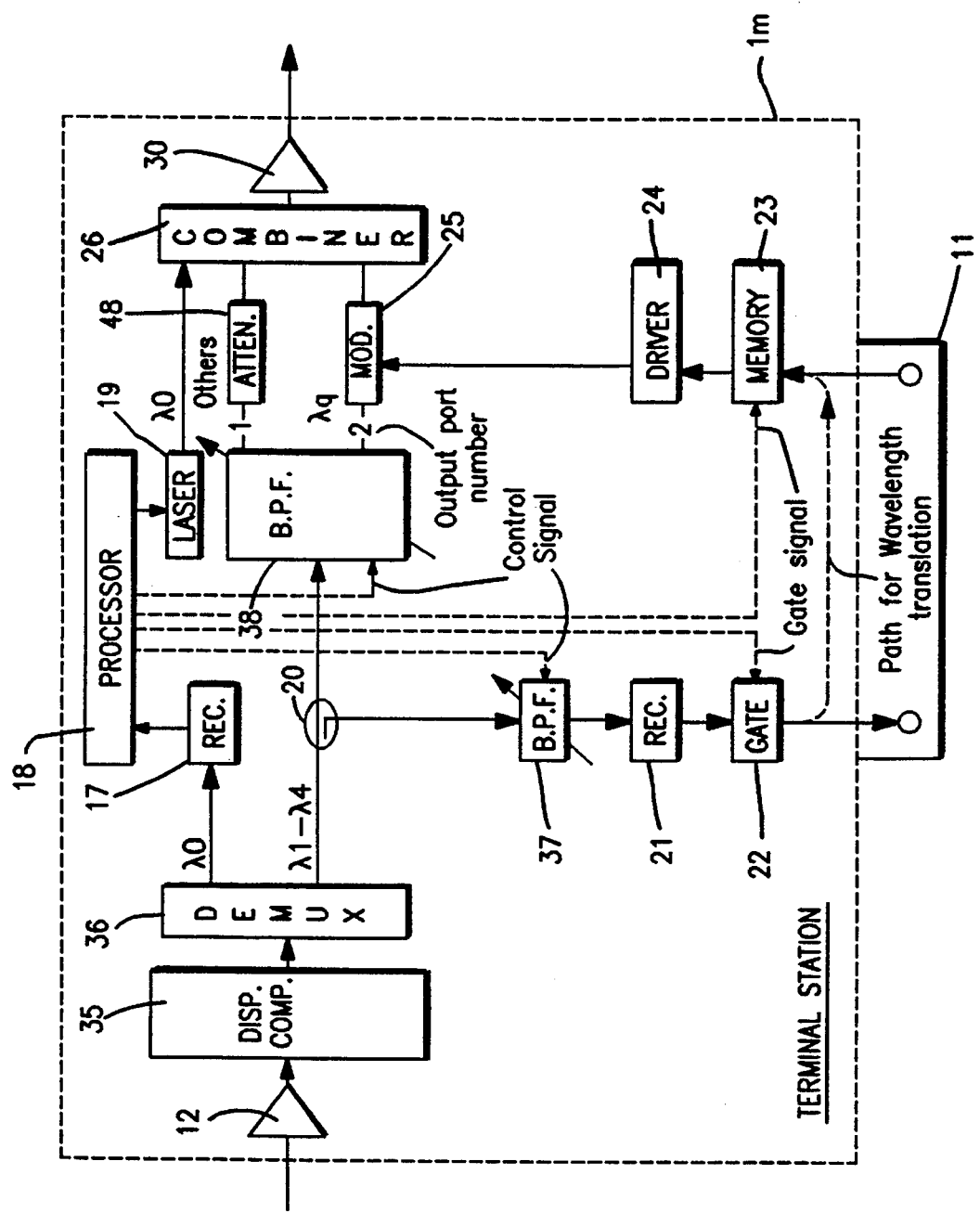
FIG. 9 is a block diagram showing schematically the structure of a terminal station according to a fifth embodiment of the invention.

FIG. 9 shows the terminal station 1m of the fifth embodiment. Here, the optical data transmission wavelengths $\lambda_1$–$\lambda_4$ are not demultiplexed and spatially separated as in the earlier embodiments. Instead, optical tunable filter devices are employed for selectively tuning to the desired wavelength for dropping or adding data packets. Other details of this embodiment are as described in the earlier embodiments unless otherwise indicated below.

Accordingly, in this embodiment, the received optical signal is dispersion equalised by a dispersion compensator 35 (which is preferably a single length of dispersion compensation fiber as discussed in the above disclosed Belov and Onishi papers). The dispersion-compensated, wavelength multiplexer optical signal is then fed to a wavelength demultiplexer 36. This demultiplexer 36 merely separates the signalling wavelength $\lambda_0$ on to one spatial path, and leaves all four data transmission wavelengths $\lambda_1$–$\lambda_4$ on a second path. A coupler 20, the output of which is connected to a receiver 21 and a gate circuit 22 as in the first embodiment, is located in the combined data transmission wavelength path.

Interposed between the coupler 20 and the receiver 21 is a tunable bandpass filter 37, for example an acoustically-tunable optical filter as described in Applied Physics Letters Vol. 56(3), 15 Jan. 1990, D. A. Smith et al; "Polarisation—Independent Acoustically Tunable Optical Filter", or in IEEE Photonics Technology Letters Volume 1 (2) pages 38–40, February 1989, K. Cheung et al; "Electronic wavelength Tuning Unit Acousto Optic Tunable Filter with Broad Continuous Tuning Range and Narrow Channel Spacing", (referenced in the above mentioned Chlamtac paper). The tunable bandpass filter 37 is controlled by the processor 18 to pass only one of the wavelengths $\lambda_1$–$\lambda_4$, which has been detected by the processor to be free on the basis of data on the signalling channel $k_0$.

The optical path followed by the combined wavelengths $\lambda_1$–$\lambda_4$ also passes to a further tunable bandpass filter 38 (which may be of the same type as the filter 37). The tunable optical filter 38 splits the combined optical signal into a bandpass output which is fed to a modulator 25 (as in the preceding embodiments), and a band reject output which is fed to an attenuator 48 having the same attenuation characteristics as the modulator 25. The outputs of the attenuator 48 and the modulator 25 are then recombined, together with the signalling wavelength output $X_0$ of the transmitter 19, in a combiner 26 (e.g. a coupler) and output via an amplifier 30.

Thus, when a data packet is to be added in this embodiment, the processor 18 controls the filter 38 to select its passband to correspond to the desired wavelength (for example the wavelength $\lambda_4$), which is accordingly modulated by the modulator 25, all other wavelengths passing through the reject output of the filter 38, and being recombined with the modulated wavelength in the combiner 26.

It will be apparent that variations may be made to the structure of this embodiment. For example, the tunable bandpass filter 37 could be replaced by a wavelength demultiplexer receiving the output of the coupler 20, and providing for wavelength demultiplexed light paths one containing each of the transmission wavelengths, which can then either be routed to a single receiver 21 using a 4×1 optical switch as in the preceding embodiment, or fed to four respective receivers 21a–21d, the output of one of which is selected by a 4×1 electrical switch as in the above embodiment, or the outputs of the four receivers 21a–21d could be provided to separate memories to allow up to four data packets on different wavelengths to be simultaneously dropped. This arrangement could be used also in the above embodiments.

The gate 22 can be omitted if the bandpass filter 37 is controlled by the processor 18 to switch to a wavelength other than one of the wavelengths $\lambda_1$–$\lambda_4$ thus effectively blocking the transmission of all data therethrough.

The tunable optical filters 37 and 38 could instead be grating filters, dielectric thin film filters, fiber Fabry-Perot filters, or filters of the type disclosed in EP 0452895.

Multiple filters 38 could be provided to allow more than one data packet to be added simultaneously.

As in the above embodiments, it may be possible to dispense with the optical amplifiers 12, 30, the dispersion equaliser 35, and the attenuator 48, or to provide instead of the attenuator 48 an optical amplifier in the path of the modulator 25.

In other respects, this embodiment may involve features of the above described embodiments.

In summary, in this embodiment, a tunable bandpass filter is used in the add path and/or in the drop path, of each terminal station 1 to separate out the desired wavelength. This embodiment offers greater flexibility than the above described embodiments, because the bandpass filters 37, 38 can have continuously-variable or controllable characteristics, and so the terminal stations 1 can be utilised without changing hardware when the data transmission wavelengths are changed or added to, merely by changing the control signals supplied by the processors 18 to the filters 37, 38. Thus, this embodiment offers the potential for greater flexibility than the above described embodiments.

Sixth Embodiment

Figure 10:
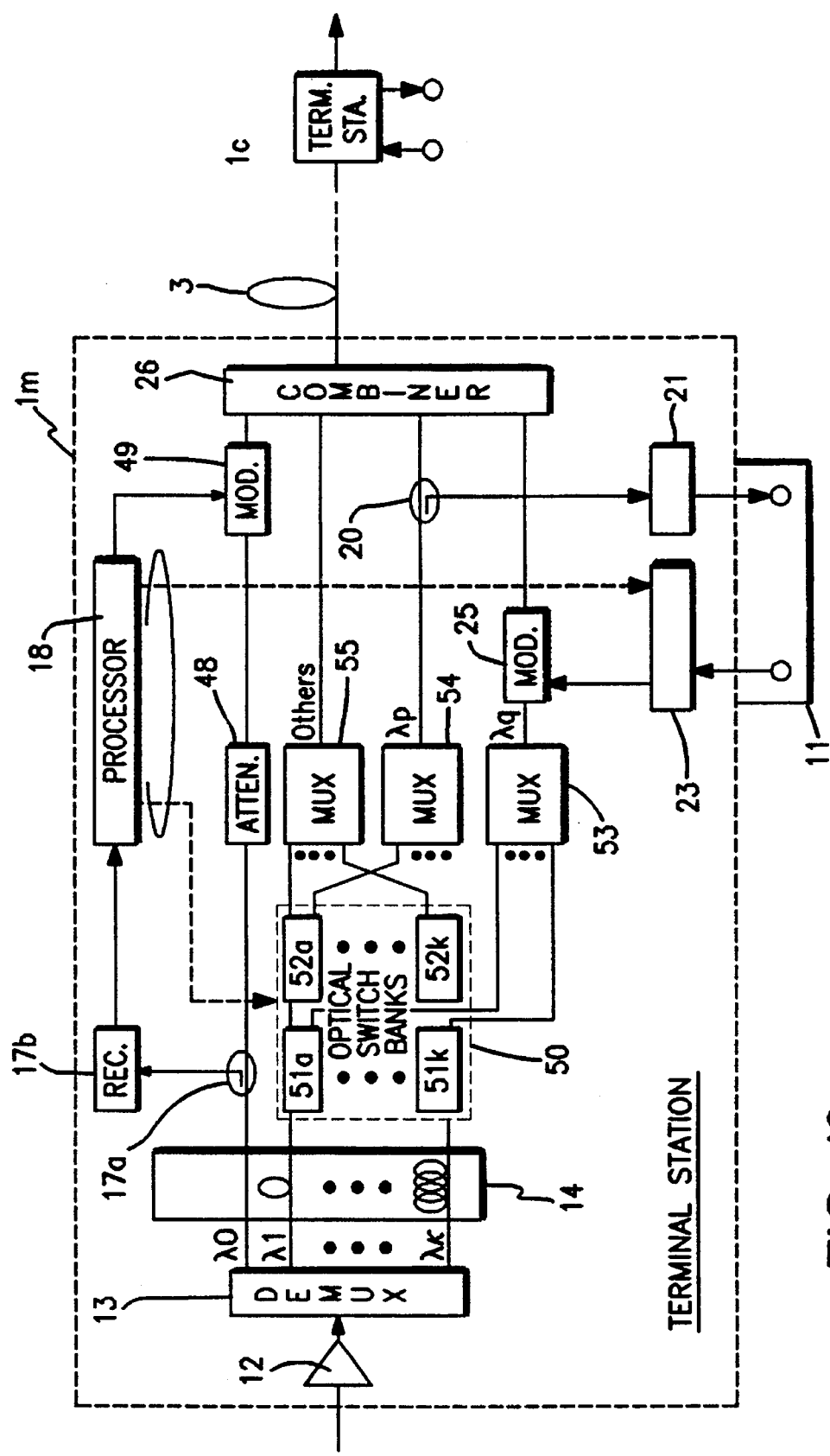
FIG. 10 is a block diagram showing schematically the structure of a terminal station according to a sixth embodiment of the invention.

FIG. 10 shows the station 1m of the sixth embodiment, this differing in two respects from the first embodiment.

Firstly, in this embodiment, the signalling wavelength transmitter 19 is omitted, and the signalling wavelength receiver 17 of the first embodiment is replaced by a coupler 17a coupling to the signalling wavelength light path, the output of which is supplied to a receiver 17b (which functions identically to the receiver 17 in the first embodiment). In this embodiment, the signalling wavelength path is continuous, and leads through to the combiner 26.

The operation of this embodiment will now be described with reference to FIGS. 11a and 11b. The head station 2 operates the signalling wavelength laser diode 6-0 to generate the signalling wavelength $\lambda_0$ having an initial portion in each time slot in which any signalling data is present, followed by a CW portion extending for the rest of each time slot.

The signalling wavelength light path in each of the terminal stations 1 passes through a modulator 49 (see FIG. 10) controlled by the processor 18, which modulator is arranged to modulate part of the previously CW portion of each time slot, when that terminal station has data to transmit in the next time slot. Thus, as the signalling wavelength $\lambda_0$ passes through successive terminal stations, the CW portion in each time slot may progressively be filled. The operation of the processor 18 in this embodiment will be described in greater detail below.

The second difference between this embodiment and the first embodiment is in the structure of the routing means whereby the demultiplexed wavelengths are routed to the modulator 25 and the coupler 20 (the component 24 is omitted from the diagram for clarity). Instead of the non-blocking optical switch 15 of FIGS. 2b and 5b, a bank 50 of optical switches is provided, this bank having k inputs (where k is the number of data wavelengths) and three groups of k outputs.

The bank 50 comprises a first array 51a–51k of 1×2 optical switches, each receiving one of the output optical paths of the wavelength demultiplexer 13 and providing two output paths. Each of the output ports of the switches 51a–51k is routed to a respective input port of a wavelength multiplexer 53 (e.g. a grating filter device or any of the other types of wavelength multiplexer disclosed above), the output of which passes to the modulator 25.

The other output port of each of the switches 51a–51k forms the input to a respective one of a second array of optical 1×2 switches 52a–52k. One of the output ports of each of the second array of switches 52a–52k is supplied to a respective input port of a wavelength multiplexer 54, the output of which is supplied to the coupler 20. The other output port of each of the switches 52a–52k is connected to a respective input of a further wavelength multiplexer 55, the output of which passes straight to the combiner 26.

Thus, when a data packet is to be transmitted, the switch driver circuit 16 (omitted for clarity in FIG. 10) is controlled by the processor 18, to switch one of the switches 51a–51k to pass the respective input wavelength to the wavelength multiplexer 53 and the modulator 25, where it is modulated. All the other first switches 51a–51k are controlled to route their outputs through the respective second switches 52a–52k, all of which are set to route their outputs to the wavelength multiplexer 55. The modulated wavelength is recombined with the others from the wavelength multiplexer 55 at the combiner 26.

When the terminal station 1m is to receive a data packet, the processor 18 controls all of the first switches 51a–51k to route their outputs to the respective second switches 52a–52k. The processor 18 causes the switch control circuit 16 to set one of the second switches 52a–52k to route its output to the wavelength multiplexer 54, to the output of which the coupler 20 is connected, and to set all the other switches 52a–52k to route their outputs to the wavelength multiplexer 55.

The tapped wavelength from the coupler 20 is recombined with all the others from the wavelength multiplexer 55 in the combiner 26.

In this embodiment, the gate circuit 22 is unnecessary, because no data passes through the coupler 20 except when a data packet is to be dropped.

In this embodiment, it will be seen that, if the terminal station 1m is inactive, i.e. the terminal station 1m is either not dropping a data packet or transmitting a data packet, all the data transmission wavelengths $\lambda_1$–$\lambda_4$ are routed through identical paths through the first switches 51a–51k, through the second switches 52a–52k, and through the wavelength multiplexer 55 and the combiner 26, and accordingly all receive identical attenuation in that terminal station in contradistinction from the first and third embodiments, in which some wavelengths pass through either the coupler 20 or the modulator 25 even when the terminal station is inactive).

Referring once more to FIGS. 11a and FIG. 11b, it will be seen that the head station 2 generates a CW signal on each of the data transmission wavelengths $\lambda_1$–$\lambda_4$ (see FIG. 11a), and generates on the signalling wavelength $\lambda_0$ a signal which contains signalling information at the start of each time slot (to synchronise the terminal stations) and CW modulation thereafter.

Figure 11B:
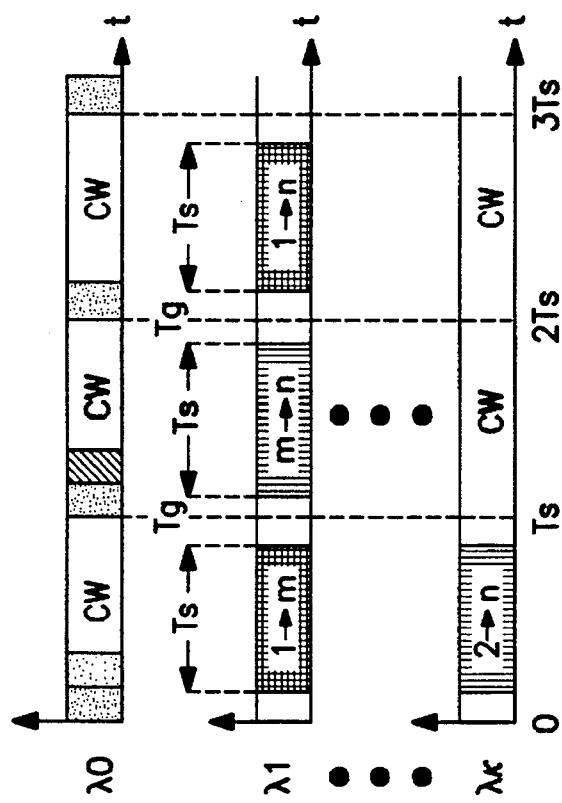
FIGS. 11a and 11b are diagrams showing the contents of the wavelengths of FIG. 3 over time at progressive intervals in a network according to the embodiment of FIG. 10.
Figure 11A:
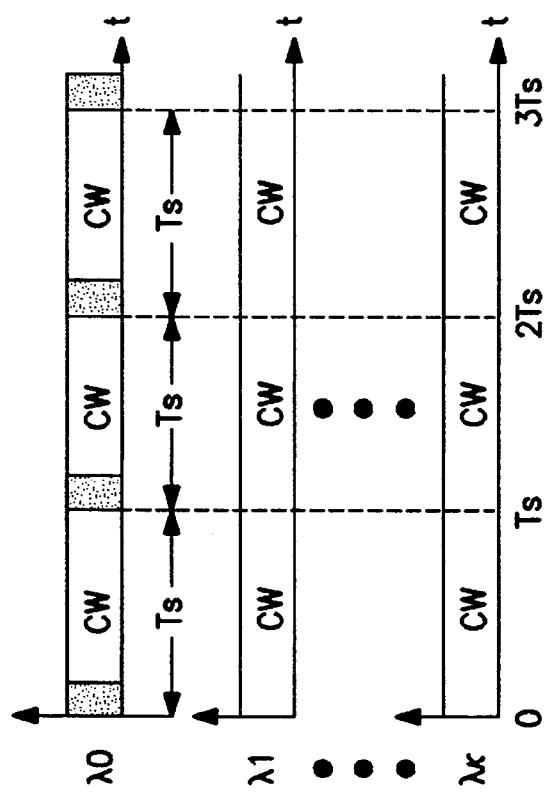

In FIG. 11b, the corresponding content of the signalling and data transmission wavelengths is indicated for the terminal station 1m. In the first time slot (t=0 to T), the processor 18 has previously learned (from data on the signalling wavelength $\lambda_0$ in the previous time slot) that a data packet from the first station 1a will be arriving for that terminal station 1m on the wavelength $\lambda_1$. Accordingly, the processor 18 sets all the switches 51a–51k to pass their outputs to the switches 52a–52k, and sets the switch 52a to route its output to the wavelength multiplexer 54 to the route wavelength $\lambda_0$ to the coupler 20. All the other switches 52b–52k are set to route their outputs to the wavelength multiplexer 55. Accordingly, as previously described with regard to the earlier embodiments, the packet is read by the terminal station 1m.

Assuming now that the terminal station 1m contains in its memory 23 a data packet to be transmitted to the terminal station 1n. As in the first embodiment, the processor 18 observes the existence of a packet destined for the station $1n$ the first time slot, and accordingly does not transmit in the first time slot. In the second time slot, the processor 18 decodes the signalling information from the signalling wavelength $\lambda_0$, and notes that all wavelengths are unoccupied in the second time slot ($t=T$ to $t=2T$). Accordingly, the processor 18 controls the modulator 49 to modulate part of the CW portion in the signalling wavelength $\lambda_0$ in the first time slot, to write an indication that a data packet will be transmitted on the wavelength $\lambda_1$ from the station $1m$ to station $1n$.

During the guard time $T_g$ after the end of the data packet in the first time slot, and before the start of data packet transmission in the second time slot, the processor 18 controls the switch control circuit 16 to set the switch 51a to route its output to the wavelength multiplexer 53 and the modulator 25. All other first switches 51b–51k are set to the route their outputs to respective second switches 52b–52k, and all the second switches are set to route their outputs to the wavelength multiplexer 55. Accordingly, in the second time slot, whilst the processor 18 is receiving the signalling wavelength $\lambda_0$, the wavelength $\lambda_1$ is modulated to contain the packet from the memory 23, and all other wavelengths are passed without alteration.

It will be apparent that various modifications can be made to this embodiment. For example, the wavelength multiplexers 53/55 could be replaced by couplers (although the insertion loss would be higher). Likewise, multiple add and drop paths could be provided as in the earlier embodiments. The feature of modulating, rather than the switch structure described in this embodiment (and vice versa).

Thus, to summarise, in a first aspect of this embodiment the signalling wavelength $\lambda_0$ is not terminated and rewritten at each node with a separate laser diode or other transmitter, but instead is passed and modulated (where necessary) at each terminal station 1, so as progressively to use up the CW power thereof. This avoids the need for a stabilised light source at each terminal station 1.

In a second aspect, this embodiment provides routing of the data signalling wavelength $\lambda_0$ to either an add path or a drop path, by spatially separating the data signalling wavelengths $\lambda_1$–$\lambda_4$ and employing an optical switch to route them. Thus, when the terminal station $1m$ is inactive, all the data signalling wavelengths $\lambda_1$–$\lambda_4$ may be routed so as to bypass the drop path and the add path.

Seventh Embodiment

Figure 12:
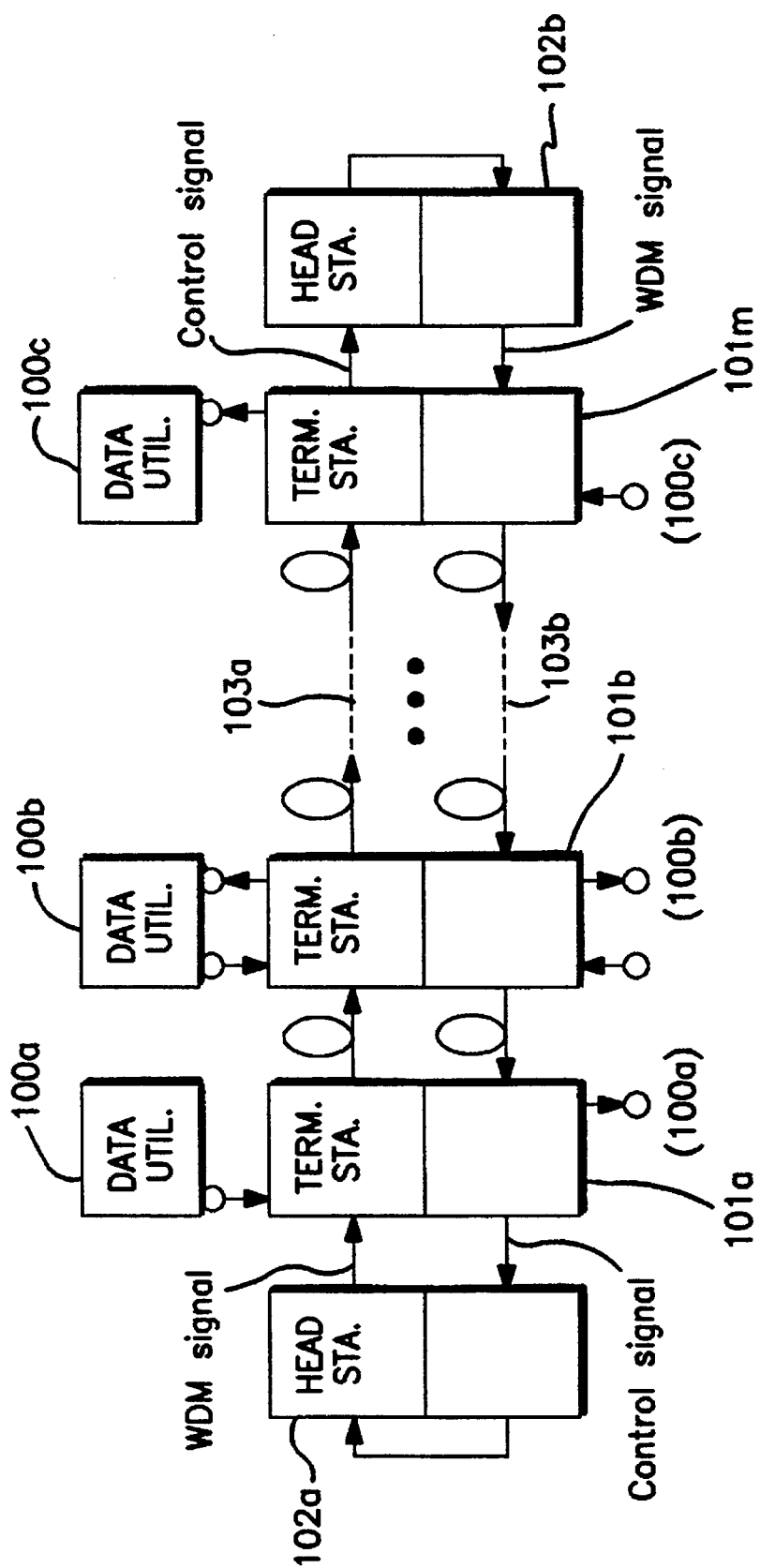
FIG. 12 shows a double bus network arrangement according to a seventh embodiment of the invention.

FIG. 12 shows the seventh embodiment which is an improvement of that illustrated in FIG. 1, having a double bus structure comprising a first bus 103a and second bus 103b. A plurality of terminal stations 101a, 101b . . . 101n are provided, each interconnected by optical fiber forming part of the bus 103a and optical fiber forming part of the bus 103b. The two buses 103a, 103b communicate data in opposite directions. At either end of the chain of interconnected terminal stations 101a–101n, upstream and downstream of the first and last terminal stations, are a pair of head stations 102a, 102b.

Each of the terminal stations 101 comprises, essentially, two terminal stations as described in any of the foregoing embodiments; one for receiving and transmitting packets of data on the bus 103a, and one for receiving and transmitting packets of data on the bus 103b. Thus, in this embodiment, data can not only be signalled from a terminal station to any station downstream (i.e. further away from the head node) but in both directions. Accordingly, each terminal equipment 100 is connected to both halves of the associated terminal station 101, and a simple decision circuit is provided to route data for transmission to one of the two halves depending on the location of the destinational terminal station. In this embodiment, the structure of each of the terminal stations 10 1 is preferably somewhat simplified by providing only a single processor 18 shared by, and controlling, both halves of that terminal station, and making the decision as to which bus 103a or 103b to transmit a message on.

Of course, the furthest station along the bus 103a can only transmit data on the bus 103b, and the furthest station along the bus 103b can only transmit data along the bus 103a.

In this embodiment, the last terminal station 101a on the bus 103b is preferably arranged to communicate the signalling wavelength $\lambda_0$ to the processor 4 of the head station 102a of the bus 103a, and the last station 101n along the bus 103a is likewise preferably arranged to transmit the signalling wavelength of the bus 103a to the processor 4 of the head station 102b of the bus 103b. In this manner, any information on component failures or traffic conditions along one of the buses 103a, 103b can be transmitted bac to the head station of that bus via the other bus.

Thus, this double bus arrangement can be us ed to signal between terminal equipment 100 of equal status (for example a plurality of computer terminals).

Eighth Embodiment

Figure 13:
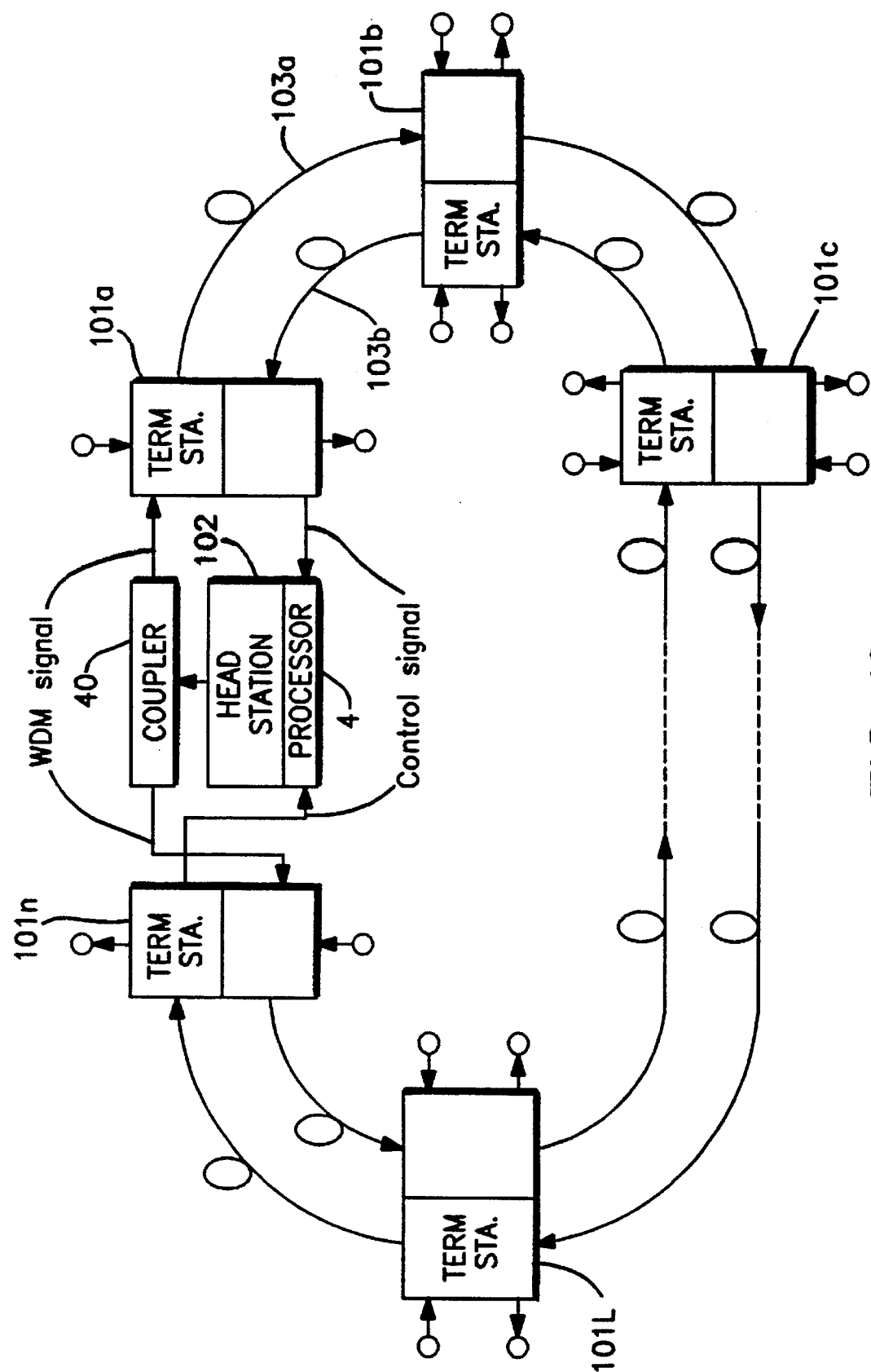
FIG. 13 shows a double looped bus arrangement according to an eighth embodiment of the invention.

FIG. 13 shows a modification of the structure of the bus of the preceding embodiment, the modification being to connect the last station on each bus with the first station on that bus. It would be possible to provide two head stations in this embodiment, as in the preceding embodiment. However, since the head station 102 in each case may simply be generating CW wavelengths for each bus, a single head station 102 can be used to join both buses as shown in FIG. 13. The last terminal station (101n) along bus 103a is shown in FIG. 13. The last terminal station (101n) along bus 103a is connected to the processor 4 of the head station 102, as in the preceding embodiment, to signal back any status information from the terminal stations along the bus 103a. Likewise, the last terminal station 101a on the bus 103b is connected to the processor 4 for the same purpose. The wavelength division multiplexed signal generated by the head station 102 is supplied to a coupler 40 which splits the signal into two parts for transmission to the first station 101n of the bus 103b, and to the first station 101a of the bus 103a. In all other respects, this embodiment functions in the same manner as the preceding embodiment.

It will also be apparent that the single bus arrangement of FIG. 1 could be connected in a loop, so that signalling information from the terminal stations of the bus 3 may be returned to the head station 2. In this case, it would also be possible for the terminal stations (for example the last terminal station in the bus) to transmit data intended for earlier stations in the bus, if a further terminal station is provided within the head station 2 and data packets are decoded and wavelength translated for retransmission by the head station.

This embodiment may be made more efficient than the preceding embodiment, in that a single head station 2 can be employed to operate the two buses 103a, 103b, rather than a pair of head nodes 102a, 102b as in the preceding embodiment.

Ninth Embodiment

Figure 14:
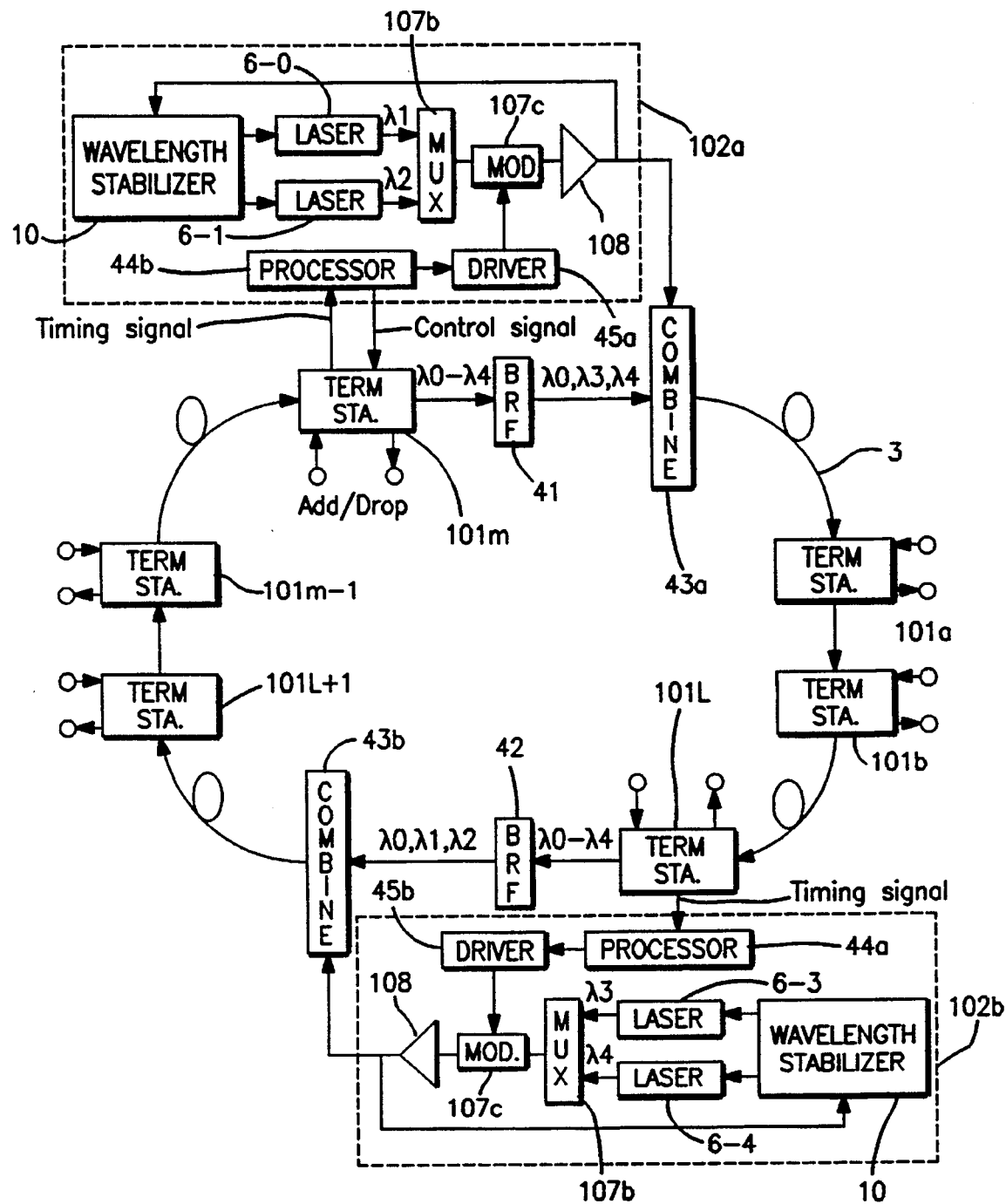
FIG. 14 shows a single looped bus arrangement according to a ninth embodiment of the invention.

In this embodiment, (see FIG. 14), the bus 3 is connected in a ring configuration. The terminal stations 101a to 101n may be as described in any of the first to fifth embodiments. The head stations 102a, 102b use different data transmission wavelengths. The head station 102a generates CW signals on the data wavelengths $\lambda_1$ and $\lambda_2$ using the laser diodes 6-1 and 6-2; the other components of the head station 102a being as described in the second embodiment. The head station 102b generates data transmission wavelengths $\lambda_3$ and $\lambda_4$ using the laser diodes 6-3 and 6-4; the other components of the head station 102b being as described in the second embodiment.

The wavelength multiplexed CW output of the head station 102a is coupled onto the bus 3 by a combiner 43a, and that of the head station 102b by a combiner 43b. A band reject filter 41 is provided upstream of the combinet 43a, the band reject filter cutting the wavelengths $\lambda_1$ and $\lambda_2$, so that the preceding data modulated on the ring on these wavelengths is terminated and does not continue to recirculate round the ring. Likewise, a bandpass filter 42 is provided upstream of the combiner 43b in the bus 3, the band pass filter rejecting the wavelengths $\lambda_3$ and $\lambda_4$, so that these wavelengths do not continue to circulate around the ring.

Since each of the terminal stations 101 includes means 19 for generating the signalling wavelength $\lambda_0$, neither of the head stations 102a or 102b requires such means.

At the start of the operation of this embodiment, the station 101m generates a signalling wavelength $\lambda_0$ indicating that the wavelengths $\lambda_1$ and $\lambda_2$ are free for transmission. If the terminal station 101a wishes to communicate with the station 101(L+1), it can, therefore, generate a packet on the wavelength $\lambda_1$ as discussed in the foregoing embodiments, and regenerate the signalling wavelength $\lambda_0$ to indicate that the wavelength $\lambda_1$ is not free in the next time slot.

Upon reaching the filter 42, the wavelengths $\lambda_1$ and $\lambda_2$ continue to circulate, and so messages transmitted by preceding stations on these wavelengths continue to pass. The wavelengths $\lambda_3$ and $\lambda_4$ are blocked. At the station 101L, its processor 18 generates on the signalling wavelength $\lambda_0$ an indication that the wavelengths $\lambda_3$ and $\lambda_4$ are free for signalling; and, downstream of this station, CW data transmission wavelengths $\lambda_3$ and $\lambda_4$ are inserted by the combiner 43b for use by the subsequent stations 101 (L+1) etc.

Timing signals from the terminal stations 101L and 101m are transmitted to the processors 44a and 44b of the head stations 102a and 102b to synchronise the time slots in the wavelengths $\lambda_3$, $\lambda_4$ with those in the wavelengths $\lambda_1$, $\lambda_2$.

In this embodiment, new CW wavelengths free for transmission are added to the bus 3 part way along the bus, at the station 101L. Thus, the terminal stations following the station 101L have the same likelihood of access to a free data transmission wavelength as those earlier in the bus. This is an improvement over the bus of the first embodiment, in which the data transmission wavelengths become progressively filled along the length of the bus.

It would be possible, as in the above described embodiments, to provide for the ring to consist of two parallel buses running in opposite directions, and for each terminal station likewise to consist of parallel circuits for operating on each bus.

Tenth Embodiment

Figure 15:
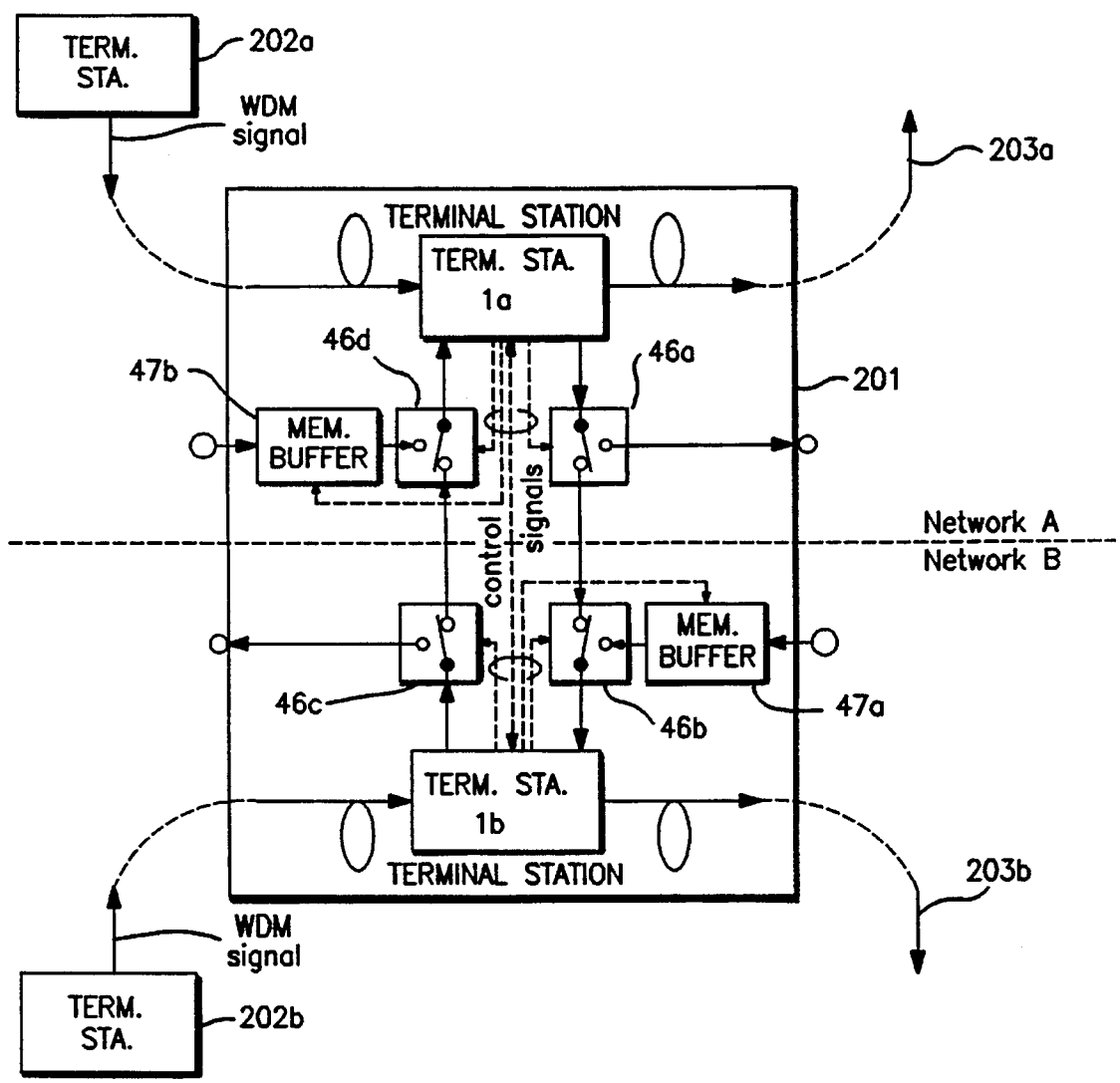
FIG. 15 is a block diagram illustrating schematically the employment of a terminal station according to a tenth embodiment of the invention to link between several different communications networks.

FIG. 15 shows the tenth embodiment, in which connection between several different optical WDM networks is disclosed. A single terminal station 201 acts as a link between two buses 203a, 203b, which may use different communications wavelengths. In this case, the electrical input and output ports of a station 1a on the bus 203a, and of the station 1b on the bus 203b are, rather than being routed directly to terminal equipment 100, routed via switches 46a–46d and input memory buffers 47a, 47b. One terminal of the switch 46a of the terminal station 1a is linked to the other terminal of the switch 46b of the terminal station 1b, and vice versa. Thus, a data packet received at the terminal station 1a of the bus 203a can be routed to the terminal station 1b of the bus 203b, and vice versa. Incoming signals from the terminal equipment 100 in this case are accordingly stored in the buffer memories 47a, 47b for transmission after the link between the buses 203a, 203b has been completed.

The two terminal stations 1a, 1b may be physically collocated in a single terminal station 201 linking the two buses 203a, 203b, or they could be separated and interconnected by communications lines. In the former case, a single processor 18 may be provided to operate both the terminal stations 1a and 1b. Otherwise, the two terminal stations 1a, 1b are appropriately arranged to exchange timing signals.

Eleventh Embodiment

Figure 16:
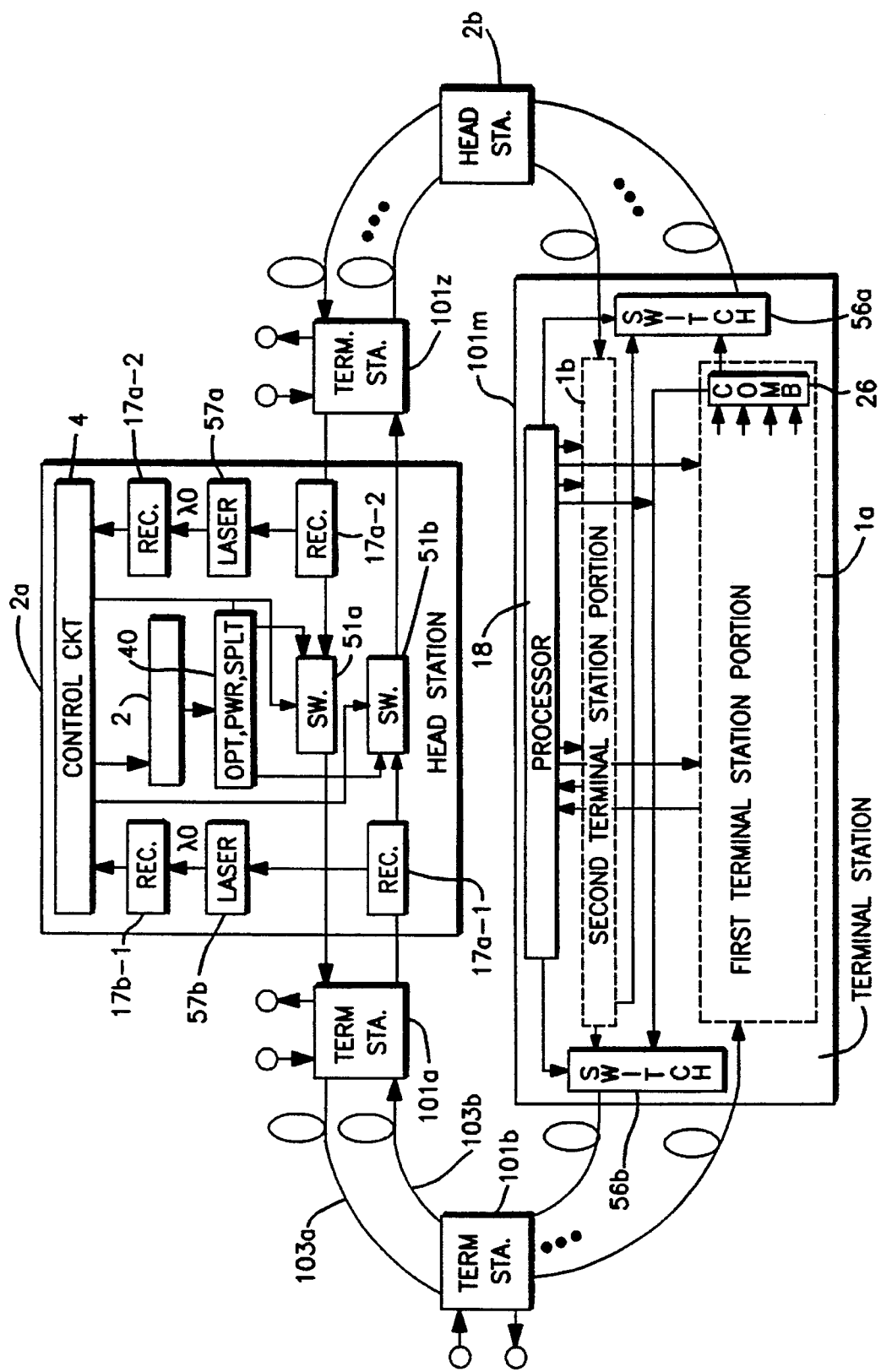
FIG. 16 is a block diagram illustrating; schematically a double bus network arrangement according to an eleventh embodiment of the invention.

FIG. 16 shows the eleventh embodiment, in which the double bus structure of FIGS. 12 and 13 is employed. However, each of the terminal stations 101 is able to communicate with any other terminal station, because the head station 2a in this embodiment includes a switch 51a on the bus 103a, and a switch 51b on the bus 103b; each switch having a position in which the wavelength multiplexed optical signal is transmitted straight through the head station, and a switch position in which the head station supplies CW data transmission wavelengths as in the above described embodiments.

In operation, initially each of the switches 51a, 51b is set to connect the output of the optical power splitter 40 (as described above in relation to the eighth embodiment) to supply CW optical signals to each of the optical fiber buses 103a, 103b, which run in opposite transmission directions round the ring of terminal stations 101a, 101b , . . . 101m . . . 101z.

After generating one time slot of data transmission wavelengths and signalling wavelength $\lambda_0$, the head station 2a closes the switches 51a, 51b, and thus permits the wavelength multiplexed optical signals from the last station 101z to pass through the head station 2a to the first terminal station 101a. Thus, the station 101z (or any other terminal station) can transmit data through the head station 2a to any terminal station (e.g. the terminal station 101a) earlier in the ring. The control circuit 4 thus alternately opens and closes the switches 51a, 51b.

In this embodiment, a single bus 103a is thus sufficient to communicate data from any one terminal station to another in the ring. However, a further bus 103b is provided to allow for fault tolerance in the event of failure of a terminal station or optical fiber between terminal stations. Also, as shown, a second head station 2b (identical to the first) is provided, the switches 51a, 51b thereof being normally closed so that the head station 2b is transparent to transmissions on either bus 103a or 103b.

In this embodiment, each of the terminal stations is of the form of the terminal station 101m, which comprises a first terminal station portion 1a connected within the bus 103a and a second terminal station portion 1b connected within the bus 103b. Each of the terminal station portions 1a, 1b is the same as that in any one of the first, third, fourth, fifth or sixth embodiments, except that it lacks a processor, and a single processor 18 is provided to control both.

Each terminal station also comprises a pair of cross coupling switches 56a, 56b, both controlled by the associated processor 18. The switch 56a routes the output of the first terminal station portion 1a either to the bus 103a or to the bus 103b, and the switch 56b routes the multiplexed optical output of the second terminal station portion 1b to either the second bus 103b or to the first bus 103a. Normally, the processor 18 maintains both switches 56a and 56b open, so that the output of the first terminal portion 1a is connected to the first bus 103a, and the output of the second terminal portion 1b is connected to the second bus 103b.

Figure 17A:
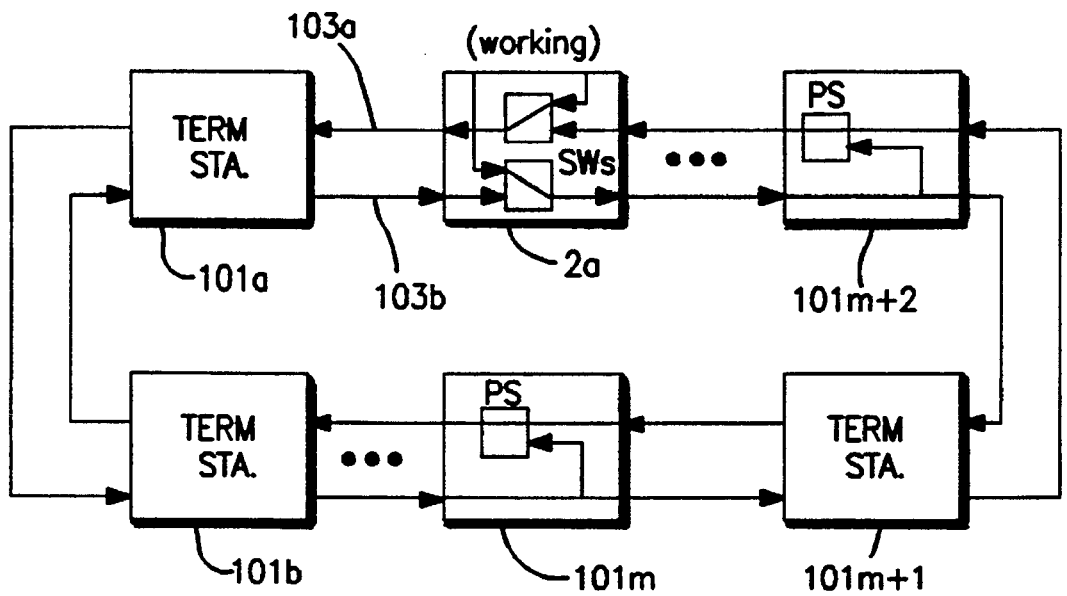
FIGS. 17a and 17b are block diagrams of the eleventh embodiment showing the operation of that embodiment in isolating a defective terminal station.
Figure 17B:
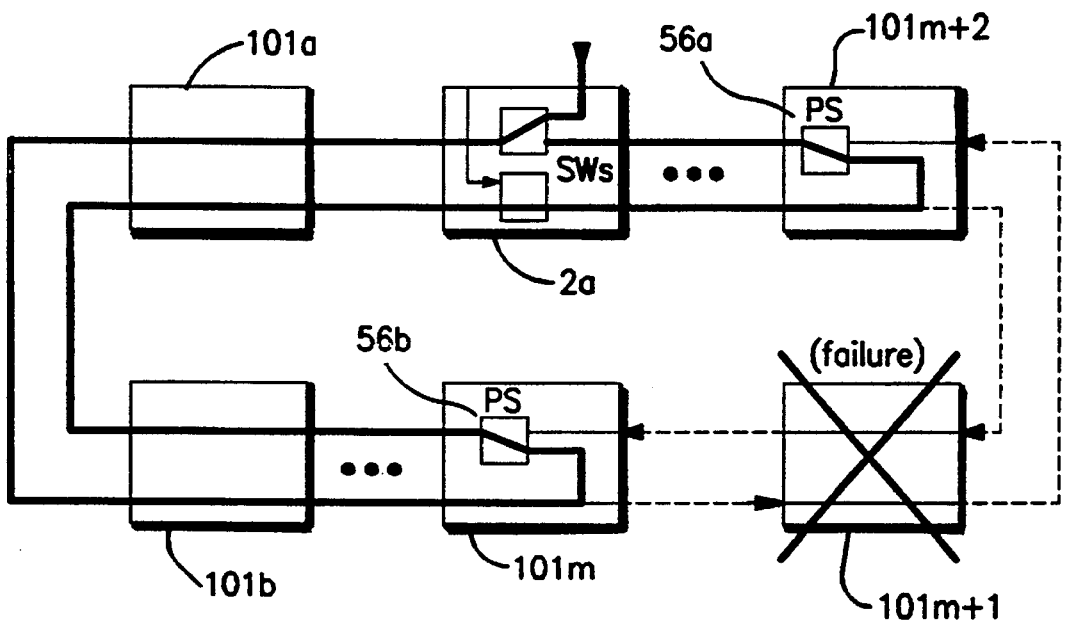

Referring to FIGS. 17a and 17b, when a terminal station 101(m+1) fails, the switch 56b of the terminal station 101m is operated to connect the bus 103a to the bus 103b at that station, and the switch 56a in the mode 101(m+2) is operated to connect the bus 103b to the bus 103a at that terminal station. Thus, the failed terminal station 101(m+1) is isolated, and the two buses now form one single continuous ring 103, along which any terminal station can communicate with any other.

In this embodiment, preferably there are provided two head stations 2a, 2b. One of the stations 2a is normally active, and the other is normally inactive (i.e. acts as a transparent link in the buses 103a and 103b ). In the event of failure of the light sources in the first head station 2a, the role of the two head stations can be reversed so that the second station 2b becomes active.

In the event of a failure affecting the switches 51a, 51b in the first head station 2a, so as to break the path through the station, the switches 56a, 56b of the adjacent terminal stations 101a, 101z can be operated as described above with reference to FIGS. 17a and 17b to isolate the defective head station 2a. The system can then continue to operate with the remaining head station 2b in a single ring.

In this embodiment, the terminal stations 101 are arranged to transmit information indicating station failure, for example on the signalling wavelength The propagation time, in this embodiment, of the signal around the ring needs to exceed the length of each time slot T.

It will be apparent that the two features of this embodiment (namely, providing a head station which can pass data transparently, so that data can recirculate twice round a ring, and providing a pair of buses together with isolation switches enabling the selective isolation of defective stations) can be used separately of each other, and separately of the distinguishing features of other embodiments. They might also be used with types of WDM communication system (for example that of EP0452895).

Other Modifications and Embodiments

It will be clear from the foregoing that many other modifications, substitutions and embodiments are possible. For example, other network configurations than those described are possible (e.g. as disclosed in WO93/21706, incorporated herein by reference).

Rather than using a separate signalling wavelength $\lambda_0$, it would be possible to use subcarriers (e.g. TDM portions of the each of the data transmission wavelengths modulated by a radio frequency or the like) as disclosed in the above referenced Chlamtac paper, or TDM portions of the data transmission wavelengths, to transmit the signalling information discussed above.

Rather than transmitting the signalling information in one time slot to indicate the contents of the next time slot, the signalling information in one time slot could indicate the contents of the next but one or subsequent data transmission time slots. Equally, it would be possible to insert a one time slot delay line in each terminal station 1, as disclosed in the above referenced Chlamtac paper, and to transmit the signalling information simultaneously with the data transmission information to which it relates, the signalling information being extracted prior to imposition of the delay.

Rather than employing a plurality of light sources 6-0 to 6-k at each head station, it would be possible to use the structure described in EP 0452895, in which a single laser component is used to generate a plurality of different wavelengths.

Although it is preferred to use passive modulation of the data transmission wavelengths as disclosed above, the possibility of using controlled re-transmission with data transmission light sources at terminal stations is not excluded.

In the foregoing, unless expressly indicated to the contrary, each feature of each embodiment may be combined with those of each other embodiment in a manner apparent to the skilled person.

In this document, the terms "light" and "optical" are intended not only to refer to the visible spectrum but also to any wavelengths which obey the laws of optics in substantial fashion.

It will be understood, from the foregoing that the invention comprehends each and every novel feature and subcombination of features disclosed, together with all obvious variants and modifications thereof. Accordingly, the scope of the invention will be understood not to be limited by the above examples but to extend to all equivalents thereof, whether or not within the scope of the accompanying claims.

Connectivity

The maximum number of terminal stations usable in this invention is not limited to the number of different light wavelengths available. It is affected by the number of light sources, however. In fact, it may be found that a larger number of data transmission wavelengths can actually reduce the maximum number of terminal stations which can be supported by a single head station, because the fraction of the total optical power on each wavelength is reduced, and consequently the signal-to-noise ratio is likewise reduced.

To give some concrete examples, making sensible assumptions about the loss of various components, it is estimated that using four different data transmission wavelengths (k=4), 1,000 terminal stations can be supported by a single head station at 155 Mbit/s data rate with an achieved capacity of 620 Mbit/s; 61 terminal stations can be supported at 2.5 Gbit/s data rate with an achieved capacity of 10 Gbit/s; and 15 terminal stations can be supported at 10 Gbit/s with an achieved capacity of 40 Gbit/s. When the number k of data transmission wavelengths is increased to 16, the number of terminal stations supported decreases to 292, 16 and 2 respectively. The number of terminal stations which can be supported may be increased by reducing the loss at each terminal station, and through other measures.

It will thus be apparent from the foregoing that the invention can enable the use of a relatively small number of wavelengths to support a much larger number of terminal stations.

We claim:

1. A terminal station for an optical communications system utilising a plurality of data transmission wavelengths, the station comprising:

sending means for sending a data signal on a free data transmission wavelength, receiving means for receiving a control signal indicating said free data transmission wavelength, and an input port for receiving said plurality of data transmission wavelengths, said sending means comprising at least one light modulator device connected to said input port to receive said free data transmission wavelength, and to modulate said free data transmission wavelength with data.

2. A station as in claim 1, in which the receiving means comprise means for separating the control signal wavelength from data signals received therewith.

3. A station as in claim 1, in which the sending means is arranged to send data in time intervals of predetermined duration and utilises a control signal received in one time interval to control the wavelength on which data will be transmitted in a following time interval.

4. A station as in claim 1, in which the receiving means is arranged to derive said indication of said free wavelength by receiving indications of other data transmission wavelengths which are not free.

5. A station as in claim 1, further comprising means for sending an amended control signal to indicate transmission by the station on said free data transmission wavelength.

6. A station as in claim 5, in which said control signal sending means comprises a light emitter.

7. A station as in claim 5, in which said control signal sending means comprises a light modulator.

8. A station as in claim 1, further comprising:

control means connected to the receiving means, the receiving means and control means being arranged to read, from the control signal, data indicating the destination of data signals on the data transmission wavelengths, the control means further being arranged, when the station has data for transmission by the sending means, to control the sending means to avoid collision with said data on said data transmission wavelengths.

9. A station as in claim 1, further comprising:

means for receiving a wavelength multiplexed optical signal and spatially separating said signal into different paths, one for each of the data transmission wavelengths, and means for recombining separate paths including different said data transmission wavelengths to provide a wavelength multiplexed optical output signal.

10. A station as in claim 9, in which the paths followed by each of the data transmission wavelengths is direct and unbranched between the separating means and the combining means, and at least one of the data sending means and the data receiving means is positioned in each of said paths, the station being provided with control means for selectively actuating the data sending means and/or the data receiving means.

11. A station as in claim 10 in which the wavelength combining means comprises a wavelength multiplexer device.

12. A station as in claim 11, in which the wavelength multiplexer device is a grating device.

13. A wavelength multiplexed optical data transmission system comprising:

a plurality of terminal stations according to claim 1, a head station, and an optical communications channel interconnecting the head station and the terminal stations.

14. A system as in claim 13, in which the head station and the terminal stations are connected in a bus configuration.

15. A system as in claim 14, in which the bus is connected in a loop via the head station.

16. A system as in claim 14, in which there are provided a plurality of head stations at different points along the said bus, the head stations generating different wavelength subsets of the data transmission wavelengths.

17. A system as in claim 14, arranged in a double bus configuration, the system comprising:

terminal nodes each comprising a first terminal station and a second terminal station, the first terminal stations of the terminal nodes being connected in a first bus signalling in a first direction and the second terminal stations of the terminal nodes being connected in a second bus signalling in the opposite direction.

18. A system as in claim 17, in which the double bus is connected in a double looped configuration.

19. A system as in claim 18, in which there is provided a single head station generating the data transmission wavelengths, and means are provided for splitting the output of the head station to the inputs of each of the buses.

20. A terminal station for an optical communications system utilising a plurality of data transmission wavelengths, the terminal station comprising:

means for sending a data signal on one of the free data transmission wavelengths, means for selecting said one data transmission wavelength from among a plurality of the data transmission wavelengths, control signal sending means for sending a control signal indicative of the destination of said data signal on a common signalling channel receivable by a plurality of other terminal stations in the system, an input port for receiving said plurality of data transmission wavelengths, and said sending means comprising at least one light modulator device connected to said input port to receive said free data transmission wavelength, and to modulate said free data transmission wavelength with data.

21. A station as in claim 20, in which the common signalling channel is on a signalling wavelength which is not a data transmission wavelength utilised by the sending means for sending said data signal.

22. A station as in claim 21, in which the control signal sending means is also arranged to transmit a control signal indicating on which of the data transmission wavelengths the data signal is to be transmitted by the sending means.

23. A terminal station as in claim 20, in which the control signal sending means comprises a light emitter.

24. A station as in claim 20 in which the control signal sending means comprises a modulator for modulating a received control signal on said common channel.

25. A terminal station for an optical communications system utilising a plurality of data transmission wavelengths, the station comprising:

data sending means for sending data on at least one, but not all, of the data transmission wavelengths simultaneously, said data sending means including at least one modulator for modulating a received light signal, a non-tunable wavelength separator for spatially separating the data transmission wavelengths from a wavelength multiplexed input to a plurality of spatially separate wavelength paths each having a fixed correspondence to one of said wavelengths, routing means for selectively coupling the data sending means to one of said wavelength paths, and combining means for recombining the output of the data sending means with the other wavelengths.

26. A station as in claim 25 in which the separating means comprises a wavelength demultiplexer.

27. A station as in claim 25, in which the routing means comprises an optical space switch.

28. A station as in claim 27, in which the optical space switch comprises a K×K non-blocking switch, where K is the number of data transmission wavelengths usable by the station.

29. A station as in claim 27, in which the optical switch has K input ports and more than K output ports, and is arranged to be able to route all the data transmission wavelengths so as to bypass any said data sending or receiving means when the terminal station is not sending or receiving data.

30. A terminal station for an optical communications system utilising a plurality of data transmission wavelengths, the station comprising:

data receiving means for receiving data on at least one, but not all, of the data transmission wavelengths simultaneously, a non-tunable wavelength separator for spatially separating the data transmission wavelengths from a wavelength multiplexed input to provide a plurality of separate wavelength paths each having a fixed correspondence to one of said wavelengths, routing means for selectively coupling the data receiving means to one of said wavelength paths, and combining means for recombining the output thereof with the other wavelengths.

* * * * *